United States Patent
Baek et al.

(10) Patent No.: US 10,440,112 B2
(45) Date of Patent: Oct. 8, 2019

(54) SERVER DEVICE INCLUDING INTERFACE CIRCUITS, MEMORY MODULES AND SWITCH CIRCUIT CONNECTING INTERFACE CIRCUITS AND MEMORY MODULES

(71) Applicant: Samsung Electronics Co., Ltd., Suwon-si, Gyeonggi-do (KR)

(72) Inventors: Joonho Baek, Yongin-si (KR); Hanjoon Kim, Namyangju-si (KR); Jeonguk Kang, Bucheon-si (KR); Dong-Uk Kim, Seoul (KR); Seungjun Yang, Hwaseong-si (KR); DuckJoo Lee, Suwon-si (KR); JinHo Yi, Suwon-si (KR); Yong-Taek Jeong, Hwaseong-si (KR); Sangyeun Cho, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 339 days.

(21) Appl. No.: 15/254,400

(22) Filed: Sep. 1, 2016

(65) Prior Publication Data
US 2017/0063992 A1 Mar. 2, 2017

(30) Foreign Application Priority Data
Sep. 2, 2015 (KR) .................. 10-2015-0124259

(51) Int. Cl.
*G06F 15/16* (2006.01)
*H04L 29/08* (2006.01)
(Continued)

(52) U.S. Cl.
CPC ........ *H04L 67/1097* (2013.01); *G06F 9/5016* (2013.01); *G06F 9/5083* (2013.01);
(Continued)

(58) Field of Classification Search
None
See application file for complete search history.

(56) References Cited

U.S. PATENT DOCUMENTS

| 7,099,926 B1 | 8/2006 | Ims et al. |
| 8,176,256 B2 | 5/2012 | Krishnaprasad et al. |
| (Continued) | | |

FOREIGN PATENT DOCUMENTS

WO  WO-2014/088660 A1  6/2014

OTHER PUBLICATIONS

Simon Peter et al., "Arrakis: The Operating System is the Control Plane", UW Technical Report UW-CSE-13-10-01, version 2.0, May 7, 2014.

(Continued)

*Primary Examiner* — Hieu T Hoang
(74) *Attorney, Agent, or Firm* — Harness, Dickey & Pierce P.L.C.

(57) ABSTRACT

A server device includes a plurality of interface circuits configured to connect with a network, and perform format conversion between network packets and data chunks, the network packets being packets communicated with the network, the data chunks complying with an internal format; a plurality of memory modules operating independently of each other; and a switch circuit connected between the plurality of interface circuits and the plurality of memory modules, the switch circuit being configured to select at least one memory module from among the plurality of memory modules based on an attribute of a first data chunk transmitted from the plurality of interface circuits and, send the first data chunk to the selected memory module, wherein the selected at least one memory module is configured to, (Continued)

decode the first data chunk, and perform a read or write operation associated with the first data chunk based on the decoding result.

20 Claims, 29 Drawing Sheets

(51) Int. Cl.
    *G06F 12/02*     (2006.01)
    *G06F 9/50*     (2006.01)
    *H04L 29/06*     (2006.01)

(52) U.S. Cl.
    CPC ........ *G06F 12/023* (2013.01); *G06F 12/0253* (2013.01); *H04L 67/1002* (2013.01); *H04L 67/1076* (2013.01); *H04L 69/16* (2013.01); *G06F 2212/1016* (2013.01); *G06F 2212/1044* (2013.01); *G06F 2212/154* (2013.01)

(56) References Cited

U.S. PATENT DOCUMENTS

| | | | |
|---|---|---|---|
| 8,370,452 B2 | 2/2013 | Harvell et al. | |
| 8,429,606 B2 | 4/2013 | Little | |
| 8,700,842 B2 | 4/2014 | Dinker | |
| 8,732,386 B2 | 5/2014 | O'Krafka et al. | |
| 8,793,531 B2 | 7/2014 | George et al. | |
| 9,037,556 B2 | 5/2015 | Castellano | |
| 9,519,486 B1* | 12/2016 | Blott | G06F 9/3867 |
| 2009/0006710 A1* | 1/2009 | Daniel | G06F 9/45558 |
| | | | 710/315 |
| 2009/0182835 A1* | 7/2009 | Aviles | G06F 12/0813 |
| | | | 709/213 |
| 2011/0283045 A1* | 11/2011 | Krishnan | G06F 9/5027 |
| | | | 711/102 |
| 2013/0159452 A1 | 6/2013 | Saldana De Fuentes et al. | |
| 2015/0124812 A1* | 5/2015 | Agarwal | H04L 45/24 |
| | | | 370/392 |
| 2015/0127658 A1* | 5/2015 | Ding | G06F 16/2255 |
| | | | 707/747 |
| 2015/0160862 A1* | 6/2015 | Blott | G06F 3/0604 |
| | | | 711/148 |
| 2016/0094638 A1* | 3/2016 | Suri | H04L 67/104 |
| | | | 709/232 |
| 2016/0098568 A1* | 4/2016 | Bushman | G06F 21/602 |
| | | | 713/189 |
| 2016/0275199 A1* | 9/2016 | Tanaka | G06F 16/951 |
| 2016/0277413 A1* | 9/2016 | Ajitomi | H04L 63/105 |
| 2016/0278067 A1* | 9/2016 | Badam | G06F 3/0619 |
| 2016/0315866 A1* | 10/2016 | Thapar | H04L 47/2408 |
| 2016/0366216 A1* | 12/2016 | Hack | H04L 67/1095 |
| 2018/0048732 A1* | 2/2018 | Zhu | G06F 16/213 |

OTHER PUBLICATIONS

Rajesh Nishtala et al. "Scaling Memcache at Facebook". 10th USENIX Symposium on Networked Systems Design and Implementation (NSDI '13). USENIX Association. 2013. p. 385-398.
Michaela Blott et al. "Dataflow Architectures for 10Gbps Line-rate Key-value-Stores". Xilinx All Programmable. 2013. p. 1-25.

* cited by examiner

FIG. 4

| | Attribute | | | | | | Switching Policy | |
|---|---|---|---|---|---|---|---|---|
| | SRC_IP | SRC_PT | DST_IP | DST_PT | KEY | CMD | MOD | ACT |
| P1 | * | * | * | * | img* | SET | all | Multicast |
| P2 | * | * | * | * | img* | GET | all | Random |
| P3 | * | * | * | * | * | * | MOD2 | Forward |
| P4 | * | * | * | * | a* | * | MOD1 | * |

| RANK1 | Invalidated Address |
|       | Invalidated Address |
| RANK2 | Invalidated Address |
|       | Invalidated Address |
| RANK3 | Invalidated Address |
|       | Invalidated Address |
| RANK4 | Invalidated Address |
|       | Invalidated Address |

| RANK1 | Previous Index (Address) |
| RANK2 | Previous Index (Address) |
| RANK3 | Previous Index (Address) |
| RANK4 | Previous Index (Address) |

| Index\Segment | S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|---|
| IDX1  | 0 | 1 | 0 | 0 | 0 | 0 | 0 | 0 | 0 | 1 | 0 | 0 | 0 | 0 | 0 | 0 |
| IDX2  | 0 | 0 | 0 | 0 | 0 | 0 | 0 | 0 | 0 | 0 | 0 | 0 | 1 | 1 | 0 | 0 |
| IDX3  | 0 | 0 | 0 | 0 | 0 | 0 | 0 | 0 | 0 | 0 | 0 | 0 | 0 | 0 | 0 | 0 |
| IDX4  | 0 | 0 | 0 | 0 | 0 | 0 | 1 | 1 | 1 | 0 | 0 | 0 | 0 | 0 | 0 | 0 |
| IDX5  | 0 | 0 | 1 | 1 | 1 | 0 | 0 | 0 | 0 | 0 | 1 | 1 | 1 | 1 | 0 | 0 |
| IDX6  | 0 | 0 | 1 | 1 | 1 | 1 | 1 | 1 | 1 | 1 | 1 | 1 | 1 | 1 | 1 | 1 |
| IDX7  | 1 | 1 | 1 | 1 | 1 | 1 | 1 | 1 | 1 | 1 | 1 | 1 | 1 | 1 | 1 | 1 |
| IDX8  | 1 | 1 | 1 | 1 | 1 | 1 | 1 | 1 | 1 | 1 | 1 | 1 | 1 | 1 | 1 | 1 |
| IDX9  | 1 | 1 | 1 | 1 | 1 | 1 | 1 | 1 | 1 | 1 | 1 | 1 | 1 | 1 | 1 | 1 |
| IDX10 | 1 | 1 | 1 | 1 | 1 | 1 | 1 | 1 | 1 | 1 | 1 | 1 | 1 | 1 | 1 | 1 |
| IDX11 | 1 | 1 | 1 | 1 | 1 | 1 | 1 | 1 | 1 | 1 | 1 | 1 | 1 | 1 | 1 | 1 |
| IDX12 | 1 | 1 | 1 | 1 | 1 | 1 | 1 | 1 | 1 | 1 | 1 | 1 | 1 | 1 | 1 | 1 |
| IDX13 | 1 | 1 | 1 | 1 | 1 | 1 | 1 | 1 | 1 | 1 | 1 | 1 | 1 | 1 | 1 | 1 |
| IDX14 | 1 | 1 | 1 | 1 | 1 | 1 | 1 | 1 | 1 | 1 | 1 | 1 | 1 | 1 | 1 | 1 |
| IDX15 | 1 | 0 | 0 | 0 | 0 | 0 | 0 | 0 | 0 | 1 | 0 | 0 | 0 | 0 | 0 | 0 |
| IDX16 | 0 | 1 | 0 | 0 | 0 | 0 | 0 | 0 | 0 | 0 | 0 | 0 | 1 | 1 | 0 | 0 |
| IDX1  | 0 | 0 | 0 | 0 | 0 | 0 | 0 | 0 | 0 | 0 | 0 | 0 | 0 | 0 | 0 | 0 |
| IDX2  | 0 | 0 | 0 | 0 | 0 | 0 | 0 | 0 | 0 | 0 | 0 | 0 | 1 | 1 | 0 | 0 |
| IDX3  | 0 | 0 | 0 | 0 | 0 | 0 | 0 | 0 | 0 | 0 | 0 | 0 | 0 | 0 | 0 | 0 |
| IDX4  | 0 | 0 | 0 | 0 | 0 | 0 | 0 | 1 | 1 | 1 | 1 | 1 | 1 | 1 | 1 | 1 |

RANK1 (rows IDX1–IDX16), RANK2 (rows IDX1–IDX4)

FIG. 29

SERVER DEVICE INCLUDING INTERFACE CIRCUITS, MEMORY MODULES AND SWITCH CIRCUIT CONNECTING INTERFACE CIRCUITS AND MEMORY MODULES

CROSS-REFERENCE TO RELATED APPLICATIONS

A claim for priority under 35 U.S.C. § 119 is made to Korean Patent Application No. 10-2015-0124259 filed Sep. 2, 2015, in the Korean Intellectual Property Office, the entire contents of which are hereby incorporated by reference.

BACKGROUND

At least some example embodiments of the inventive concepts relate to a semiconductor device, and more particularly, to interface circuits, memory modules, and a server device including a switch circuit that connects the interface circuits and the memory modules.

A data center includes an application server, a database server, and a cache server. The application server processes a request of a client and may access the database server or the cache server in response to the request of the client. The database server stores data that is processed by the application server and provides the stored data to the application server in response to the request of the application server. The cache server temporarily stores the data stored in the database server and responds to the request of the application server at a higher speed than the database server.

A response speed of the cache server or the database server may be a factor that affects an operating speed of the data center. Therefore, a cache server or a database server with a more improved operating speed is being researched and developed to improve the speed of the data center.

SUMMARY

At least some example embodiments of the inventive concepts provide to a server device having an improved operating speed.

According to at least some example embodiments of the inventive concepts, a server device includes a plurality of interface circuits configured to, connect with a network, and perform format conversion to convert a network packet, from among a plurality of network packets, into a data chunk, the network packets being packets communicated with the network, the data chunk complying with an internal format; a plurality of memory modules operating independently of each other; and a switch circuit connected between the plurality of interface circuits and the plurality of memory modules, the switch circuit being configured to, select at least one memory module from among the plurality of memory modules based on an attribute of the data chunk transmitted from the plurality of interface circuits and, send the data chunk to the selected memory module, wherein the selected at least one memory module is configured to, decode the data chunk, and perform a read operation or a write operation associated with the data chunk based on the decoding result.

The switch circuit may be configured to select two or more memory modules from among the plurality of memory modules when, the data chunk includes a key and a value, the key of the data chunk includes specific information, and a command associated with the key and the value is a write command.

The switch circuit may be configured to select one of the two or more memory modules when, the data chunk includes the key, the key of the data chunk includes the specific information, and a command associated with the key is a read command.

The switch circuit may be configured to reselect another memory module other than a specific memory module when the specific memory module is selected, the specific memory module being a memory module from among the plurality of memory modules, the specific memory module being registered at a switch table.

The switch circuit may be configured to select a specific memory module from among the plurality of memory modules when the data chunk includes a key and the key of the data chunk includes specific information, the specific memory module being designated by a switch table.

The switch circuit may include a storage circuit configured to store a switch table that includes a switch policy corresponding to the attribute of the data chunk; and a data plane circuit configured to select the at least one memory module, which corresponds to the attribute of the data chunk, based on the switch table stored in the storage circuit.

The server device may further include a control plane circuit configured to process an exception in response to a call from the data plane circuit when the exception occurs at the data plane circuit.

The control plane may be configured to generate a new policy for the data chunk and incorporate the new policy into the switch policy when the switch policy does not have information for the data chunk.

The server device may be configured such that a control plane driven by the control plane circuit is updated through at least one of the plurality of interface circuits or an out-of-band (OOB) interface.

The server device may be configured such that the switch table is updated through at least one of the plurality of interface circuits or an out-of-band (OOB) interface.

The server device may further include a management circuit configured to perform load balancing with respect to the plurality of memory modules by monitoring loads of modules from among the plurality of memory modules and updating the switch table based on a result of the monitoring.

The management circuit may be configured to forward the data chunk to an external device through the plurality of interface circuits when a load of the server device is greater than or equal to a threshold value.

The management circuit may be configured to forward the data chunk to an external device through an out-of-band (OOB) interface when a load of the server device is greater than or equal to a threshold value.

Each interface circuit from among the plurality of interface circuits may include a Transmission Control Protocol/Internet Protocol (TCP/IP) offload circuit configured to extract a payload from a TCP/IP packet among the network packets received from the network.

The data chunk may include at least one packet, the at least one packet may include a header and a payload, and the switch circuit may be configured to select the at least one memory module based on the payload of the at least one packet.

The memory modules of the plurality of memory modules may be first memory modules, and each first memory module from among the plurality of memory modules may include a plurality of second memory modules, and a memory controller configured to control the plurality of second memory modules, and the memory controller may include a storage circuit configured to store a first process table that includes a memory allocation policy corresponding to a first attribute of the data chunk, and a data plane circuit configured to, allocate a storage space in which the data chunk is to be written, based on the first process table stored in the storage circuit and the first attribute of the data chunk, and write the data chunk at the allocated storage space.

The server device may be configured such that the first process table is updated through at least one of the plurality of interface circuits or an out-of-band (OOB) interface.

The storage circuit may be configured to further store a second process table that includes an execution policy of a garbage collection and a third process table that includes a process policy of the data chunk; and the data plane circuit may be configured to perform the garbage collection, in which storage spaces where valid data of the plurality of memory modules is stored are gathered, based on the second process table, and perform at least one of compression, decompression, encryption, decryption, or downsizing of image data based on the third process table.

According to at least some example embodiments of the inventive concepts, a server device includes a plurality of interface circuits configured to, connect with a network, and detect keys from network packets received from the network; a plurality of memory modules operating independently of each other; and a switch circuit connected between the plurality of interface circuits and the plurality of memory modules and configured to, select at least one memory module from among the plurality of memory modules based on a key transmitted from the plurality of interface circuits, and send the key to the selected a least one memory module, the selected at least one memory module being configured to, decode the key, and perform a read operation or a write operation associated with the key based on the decoding result.

According to at least some example embodiments of the inventive concepts, a device includes a plurality of interface circuits configured to, receive a network packets from a network, the network packets being data packets of a first data format, and convert the network packets to internal packets, the internal packets being data packets of a second data format; and a switch circuit connected to the plurality of interface circuits, the switch circuit being configured to, receive one of the internal packets, obtain attribute information indicating at least one attribute of the received internal packet, select at least one memory module from among a plurality of memory modules based on the at least one attribute, and send the received internal packet to the selected memory module.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 4 is a drawing illustrating an example of a switch table;

FIG. 23 is a table illustrating an example of invalidated addresses which an invalidation register stores;

FIG. 24 is a table illustrating an example of previous addresses which a previous index register stores;

FIG. 25 is a table illustrating an example of an address table;

FIG. 29 is a drawing illustrating an example in which a value and metadata associated with the value are stored in a memory when a memory allocator of a log-structured way is used;

DETAILED DESCRIPTION

Figure 1:
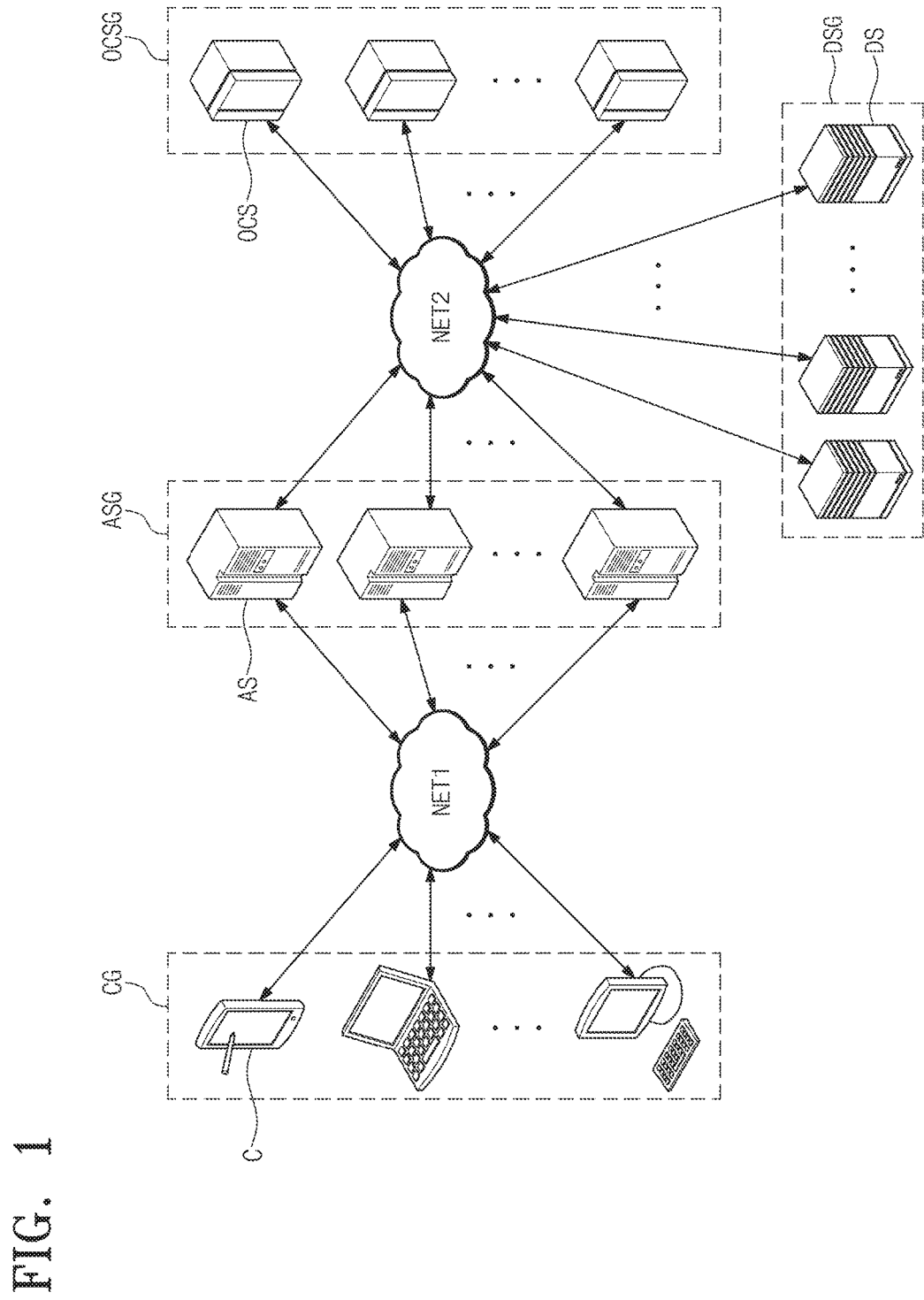
FIG. 1 is a drawing illustrating a computer network according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a drawing illustrating a computer network according to at least one example embodiment of the inventive concepts. Referring to FIG. 1, the computer network may include a client group CG, a first network NET1, an application server group ASG, a second network NET2, an object cache server group OCSG, and a database server group DSG.

The client group CG may include a plurality of client devices C. The client devices C may communicate with the application server group ASG through the first network NET1. The client devices C may include various devices including, for example, smartphones, smart pads, notebook computers, personal computers, smart cameras, and smart televisions. The first network NET1 may be or include, for example, the Internet.

The application server group ASG may include a plurality of application server devices AS. The application server devices AS may receive various requests from the client devices C through the first network NET1. The application server devices AS may store data, which the client devices C request the application server devices AS to store, in the database server group DSG through the second network NET2. The application server devices AS may store data, which is stored in the database server group DSG, in the object cache server group OCSG. The application server devices AS may obtain data, which the client devices C request the application server devices AS to read, from the object cache server group OCSG through the second network NET2. When the requested data does not exist in the object cache server group OCSG, the application server devices AS may obtain data, which the client devices C request the application server devices AS to read, from the database server group DSG through the second network NET2.

The database server group DSG may include a plurality of database server devices DS. Each of the database server devices DS may provide non-volatile mass storage.

The object cache server group OCSG may include a plurality of object cache server devices OCS. The object cache server devices OCS may perform cache functions between the application server devices AS and the database server devices DS, respectively. The object cache server devices OCS may temporarily store data that is stored in the database server devices DS through the second network NET2 or data that is read from the database server devices DS. Each of the object cache server devices OCS may provide high-speed storage. For example, each of the object cache server devices OCS may provide DRAM-based storage.

The second network NET may include, for example, a local area network (LAN) or an intranet.

Figure 2:
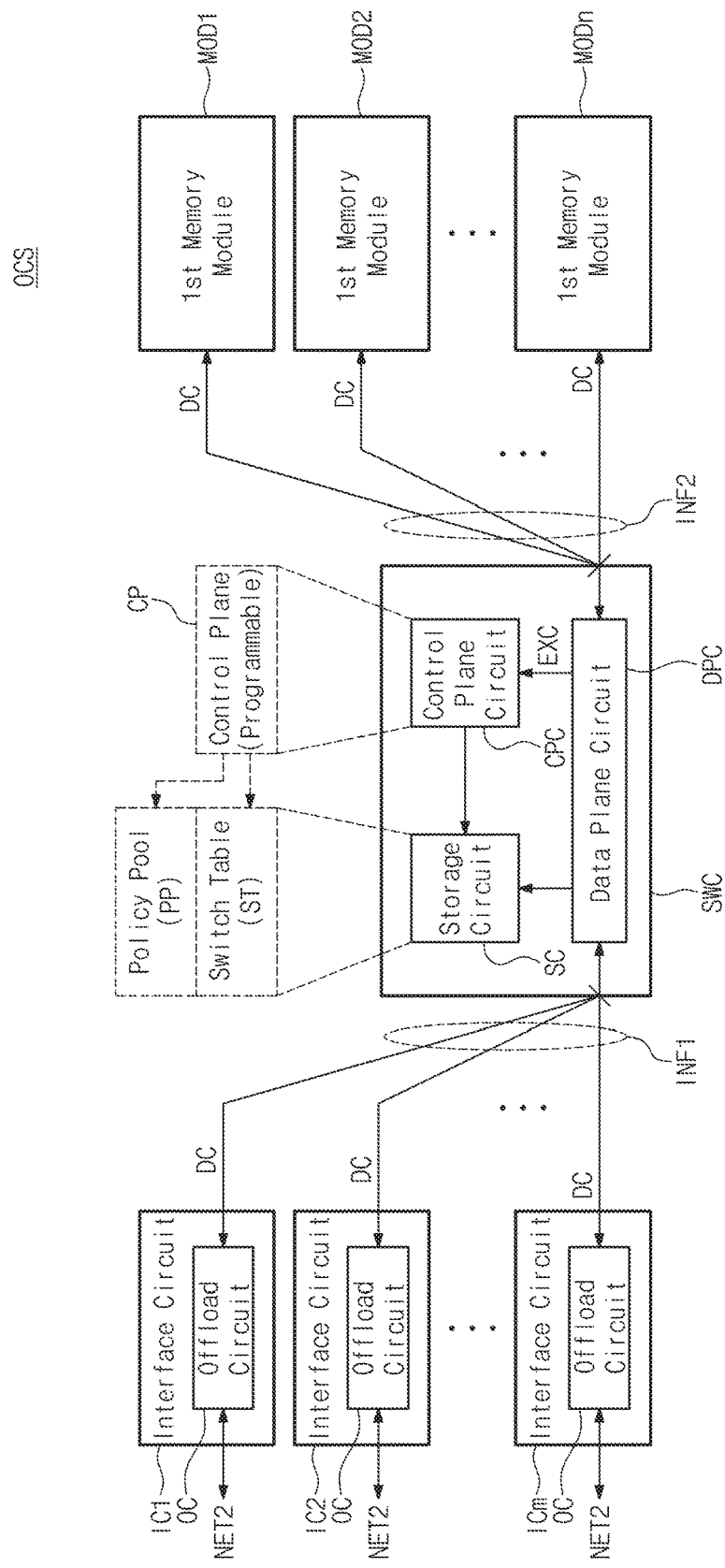
FIG. 2 is a block diagram illustrating an object cache server device according to at least one example embodiment of the inventive concepts.

FIG. 2 is a block diagram illustrating the object cache server device OCS according to at least one example embodiment of the inventive concepts. Referring to FIG. 2, the object cache server device OCS may include a plurality of interface circuits IC1 to ICm, a switch circuit SWC, and a plurality of memory modules MOD1 to MODn.

The interface circuits IC1 to ICm may communicate with the second network NET2 based on a first data format and may communicate with the switch device SWC based on a second data format. Each of the interface circuits IC1 to ICm may include an offload circuit OC for conversion between the first data format and the second data format. For example, the first data format that is conveyed through the second network NET2 may be a Transmission Control Protocol/Internet Protocol (TCP/IP) format. The second data format that is conveyed through the switch circuit SWC may be a PCIe format or a vendor format that is defined by a vendor of the object cache server device OCS. For descriptive convenience, the second data format is assumed as being the PCIe format. However, at least some example embodiments of the inventive concepts may not be limited thereto.

Below, one of the offload circuits OC of the interface circuits IC1 to ICm will be described as an example. The offload circuit OC may remove a header from a packet of the TCP/IP format to detect a payload. The offload circuit OC may add a header, which follows or, alternatively, is based on the PCIe format, to output a data chunk DC as a packet of the PCIe format.

According to at least one example embodiment of the inventive concepts, the payload of the packet of the TCP/IP (hereinafter referred to as "TCP/IP payload") and the payload of the data chunk DC may share the same information. For example, each of the TCP/IP payload and the payload of the data chunk DC may include a key, a value, and a set command SET. Each of the TCP/IP payload and the payload of the data chunk DC may include a key and a get command GET. That is, each of the TCP/IP payload and the payload of the data chunk DC may include an access request (a write request or a read request) of a data structure that is based on key-value store.

For example, the offload circuit OC may add information, which is associated with the TCP/IP format, as the payload of the data chunk DC. For example, the offload circuit OC may add pieces of information, which correspond to a source Internet Protocol (IP) address, a source port, a target IP address, and the like, from among the information of the TCP/IP format as the payload of the data chunk DC.

The interface circuits IC1 to ICm may be identified as different network nodes that are connected to the second network NET2. For example, the interface circuits IC1 to ICm may be identified as different IP addresses or different ports on the second network NET2.

The switch circuit SWC may be connected with the plurality of interface circuits IC1 to ICm through a first interface INF1 and may communicate with the plurality of first memory modules MOD1 to MODn through a second interface circuit INF2. Each of the first interface INF1 and the second interface circuit INF2 may be, for example, a PCIe interface or a vendor interface.

The switch circuit SWC may perform a switching (or routing) operation between the plurality of interface circuits IC1 to ICm and the plurality of first memory modules MOD1 to MODn. The switch circuit SWC may receive a data chunk DC from a source interface circuit of the plurality of interface circuits IC1 to ICm. The switch circuit SWC may select at least one or more target memory modules of the plurality of first memory modules MOD1 to MODn, based on the received data chunk DC, in particular, a payload of the data chuck DC. The switch circuit SWC may transmit the received data chunk DC to the target memory module. When receiving a response from at least one target memory module, the switch circuit SWC may send the received response to a source interface circuit.

The switch circuit SWC may include a storage circuit SC, a data plane circuit DPC, and a control plane circuit CPC.

The storage circuit SC may include a switch table ST and a policy pool PP. The switch table ST may include switching (or routing) policies corresponding to properties of the payload of the data chunk DC, respectively. The policy pool PP may include policies that will be executed when an exception occurs. The storage circuit SC may have a simple structure that provides a reference table. For example, the storage circuit SC may include a ternary content addressable memory (TCAM).

The data plane circuit DPC may detect attributes of a data chunk DC received from the interface circuits IC1 to ICm and may determine a switching (or routing) policy of the data chunk DC with reference to the detected attributes and the switch table ST. Example attributes are discussed in greater detail below with reference to FIG. 4. The data plane circuit DPC may select at least one target memory module based on the determined policy and may send the data chunk DC to the at least one target memory module thus selected. The data plane circuit DPC may be implemented with hardware.

When the data plane circuit DPC receives a data chunk DC having attributes not registered at the switch table ST or when the exception such as an error occurs, the data plane circuit DPC may output an exception signal EXC to the control plane circuit CPC.

The control plane circuit CPC may perform computing and control functions and may drive a programmable control plane CP. For example, according to at least some example embodiments of the inventive concepts, the control plane circuit CPC may be or include a processor that executes computer-readable instructions (e.g., instructions included in software and/or firmware stored in such a manner as to be accessible by the control plane circuit CPC) to implement operations described herein as being performed by the control plane CP.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

When the exception signal EXC is activated, the control plane CP may determine and process the exception. For example, when a data chunk DC having attributes not registered at the switch table ST is received, the control plane CP may determine a new switching (or routing) policy with reference to the policy pool PP and may register the new switching (or routing) policy at the switch table ST. When an error occurs, the control plane CP may output an error message or may output a message, which indicates resending of the data chunk DC, to the interface circuit that was the source of the data chunk DC.

Each of the plurality of first memory modules MOD1 to MODn may receive a data chunk DC from the switch circuit SWC. Each of the plurality of first memory modules MOD1 to MODn may decode the received data chunk DC and may perform a read or write operation based on the decoding result. For example, each of the plurality of first memory modules MOD1 to MODn may remove a header from a data chunk DC to detect a payload. When the detected payload includes a key, a value, and a set command SET, each of the plurality of first memory modules MOD1 to MODn may perform a write operation. When the detected payload includes a key and a get command GET, each of the plurality of first memory modules MOD1 to MODn may perform a read operation.

As described with reference to FIG. 2, the packet of the TCP/IP format received through the second network NET2 may be converted by the offload circuit OC into a data chunk DC of the PCIe format without control of a processor. The data chunk DC may be switched (or routed) by the data plane circuit DPC to the first memory modules MOD1 to MODn based on the hardware-implemented data plane circuit DPC. Because the packet received through the second network NET2 is processed on the basis of hardware and the processed result is provided to the first memory modules MOD1 to MODn, an operating speed of the object cache server device OCS may be markedly improved compared to other server devices in which software is intervened.

According to at least one example embodiment of the inventive concepts, the object cache server device OCS may support a function of updating the control plane CP driven on the control plane circuit CPC and the switch table ST and the policy pool PP stored in the storage circuit SC. For example, the switch table ST, the policy pool PP, or the control plane CP may be updated through the plurality of interface circuits IC1 to ICm.

According to at least one example embodiment of the inventive concepts, the object cache server device OCS may operate the key-value store based data structure. One key-value store based request may be received using two or more data chunks. In this case, a first data chunk may include information about the number of all data chunks of the request. The switch circuit SWC may maintain a switching (or routing) path with reference to the information included in the first data chunk until all data chunks are transmitted.

Figure 3:
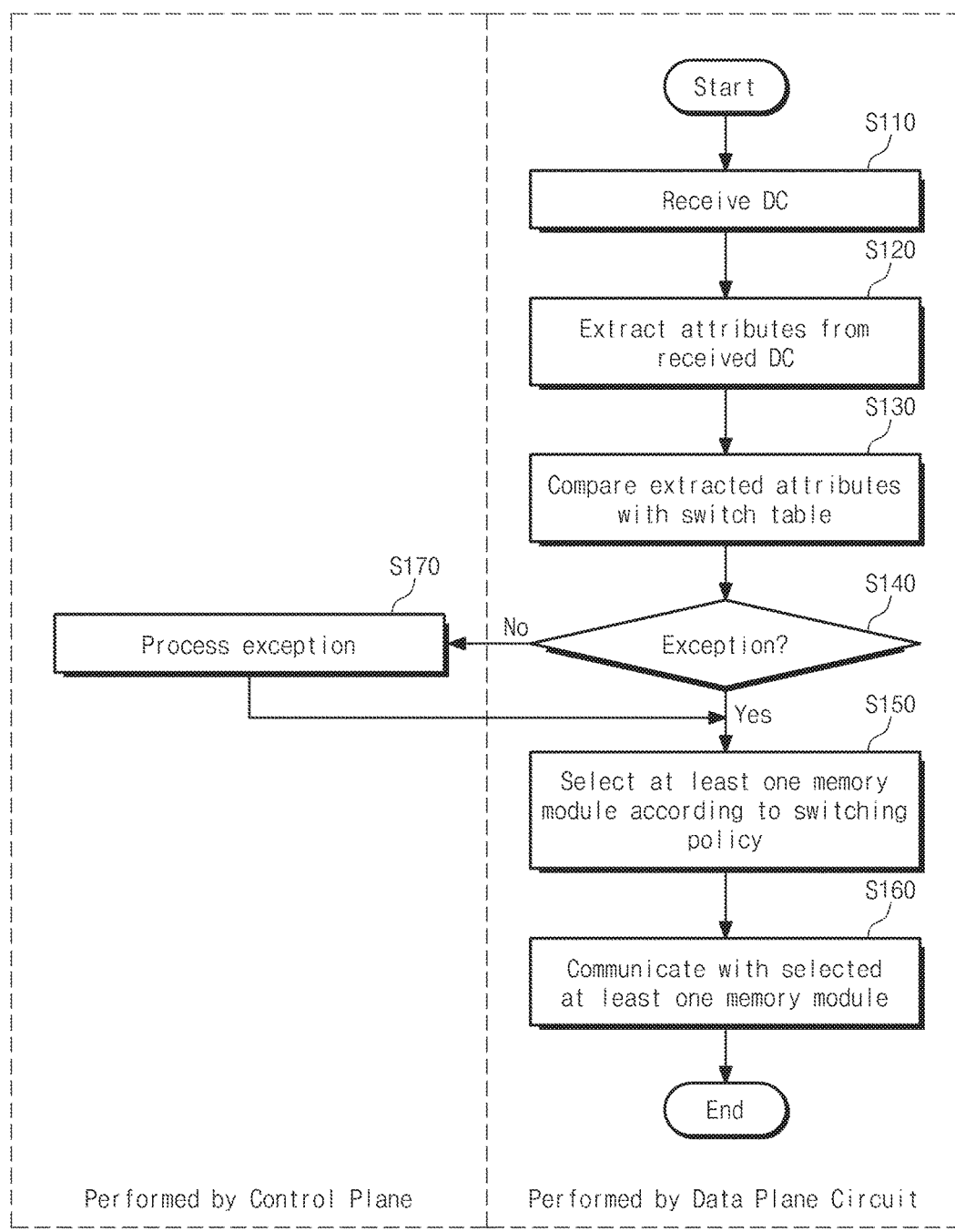
FIG. 3 is a flowchart illustrating an operating method of the object cache server device according to at least one example embodiment of the inventive concepts.

FIG. 3 is a flowchart illustrating an operating method of the object cache server device OCS according to at least one example embodiment of the inventive concepts. According to at least one example embodiment of the inventive concepts, an operating method of the data plane circuit DPC is illustrated in FIG. 3.

Referring to FIGS. 2 and 3, in step S110, the data plane circuit DPC may receive a data chunk DC. In step S120, the data plane circuit DPC may extract attributes from the received data chunk DC. In step S130, the data plane circuit DPC may compare the extracted attributes with the switch table ST.

If an exception does not occur in step S140, for example, if a switching (or routing) policy corresponding to the extracted attributes exists in the switch table ST, in step S150, the data plane circuit DPC may select at least one first memory module based on the switching (or routing) policy. In step S160, the data plane circuit DPC may send the data chunk DC to the selected at least one first memory module.

If an exception occurs in step S140, for example, if the switching (or routing) policy corresponding to the extracted attributes is absent in the switch table ST, the data plane circuit DPC may send the exception signal EXC to the control plane circuit CPC. In step S170, the control plane CP may create a new switching (or routing) policy corresponding to the extracted attributes and may register the created policy at the switch table ST. Afterwards, the method may proceed to step S150.

Steps S110 to S160 may be performed by the hardware-implemented data plane circuit DPC. That is, when an exception does not occur, the data chunk DC may be switched (or routed) by the data plane circuit DPC based on hardware, thereby improving a switching (or routing) speed of the switch circuit SWC.

Step S170 may be performed by the control plane CP. That is, when the exception occurs, the control plane CP may grasp and process the exception. As is discussed above with respect to FIG. 2, the control plane CP may be implemented by the control plane circuit CPC executing software or firmware, and thus the control plane CP may be flexibly implemented in the light of various situations. In addition, because the control plane CP is updated, it may flexibly cope with an environment or a situation change. Also, it may be possible to debug the control plane CP. As such, flexibility of the switch circuit SWC may be improved.

FIG. 4 is a drawing illustrating an example of the switch table ST. Referring to FIGS. 2 and 4, the switch table ST may include an attribute of a data chunk DC and a switching (or routing) policy corresponding thereto.

The attribute may include a key and command CMD. The key may be key-value store based information included in a payload of the data chunk DC. The command CMD may be a key-value store based command included in the payload of the data chunk DC.

According to at least one example embodiment of the inventive concepts, the attribute may further include information associated with the TCP/IP format. For example, the attribute may further include a source IP address SRC_IP, a source port SRC_PT, a target IP address DSP_IP, and a target port DST_PT.

The policy may include a target memory module MOD and an action ACT. The target memory module MOD may be a memory module(s), which are selected as a switching (or routing) target(s), from among the plurality of first memory modules MOD1 to MODn. The action ACT may be a switching (or routing) operation that is performed with respect to the target memory module.

A first policy P1 that is registered at the switch table ST may target a data chunk DC that has a set command SET and a key including "img*". When a data chunk DC corresponding to the first policy P1 is received, it may be addressed to all the first memory modules MOD1 to MODn (i.e., multicast). According to at least one example embodiment of the inventive concepts, the first policy P1 may be used to distribute and write replicas to the plurality of first memory modules MOD1 to MODn.

A first policy P2 that is registered at the switch table ST may target a data chunk DC that has a get command GET and a key including "img*". When a data chunk DC corresponding to the second policy P2 is received, the data chunk DC may be addressed one or more randomly selected modules from among the first memory modules MOD1 to MODn. For example, one of the first memory modules MOD1 to MODn may be selected (e.g., through a random or, alternatively, pseudorandom process), and the data chunk DC may be sent to the selected first memory module. The second policy P2 may be used to read data of which the replicas are distributed and stored to the first memory modules MOD1 to MODn.

When a target of the data chunk DC is the memory module MOD2, a third policy P3 that is registered at the switch table ST may be used to forward a corresponding data chunk DC to another memory module. For example, when a target memory module that is selected based on a switching (or routing) policy registered at the switch table ST is the memory module MOD2, a corresponding data chunk DC may be sent to another memory module, which is a forward target, instead of the target memory module. The third policy P3 may be used when the memory module MOD2 does not operate or when a load is focused on the memory module MOD2.

A fourth policy P4 that is registered at the switch table ST may be used to send data, which has a key including "a*", to the memory module MOD1.

According to at least one example embodiment of the inventive concepts, the policies P1 to P4 that are registered at the switch table ST may have priorities, respectively. The data plane circuit DPC may select a policy having a high priority when the attribute of a data chunk corresponds to two or more policies.

According to at least one example embodiment of the inventive concepts, the number, kinds, and content of attributes that are used in the switch table ST and the number, kinds, and content of switching (or routing) policies that are used therein may be updated through the plurality of interface circuits IC1 to ICm. The number, kinds, and content of policies P1 to P4 that are registered at the switch table ST may be updated through the plurality of interface circuits IC1 to ICm or the control plane CP.

Figure 5:
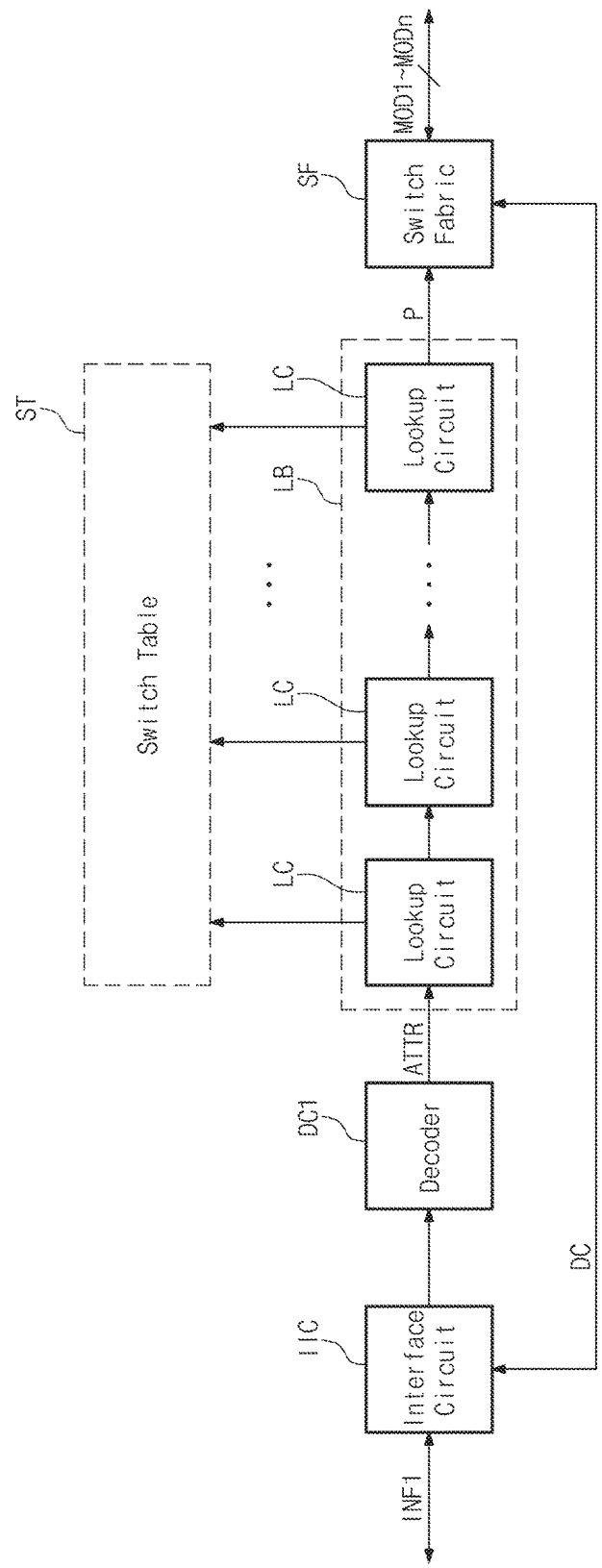
FIG. 5 is a block diagram illustrating a data plane circuit.

FIG. 5 is a block diagram illustrating the data plane circuit DPC. Referring to FIGS. 2 and 5, the data plane circuit DPC may include an interface circuit IIC, a decoder DC1, a lookup block LB, and a switch fabric SF. The interface circuit IIC may receive a data chunk DC through the first interface circuit INF1 from one of the plurality of interface circuits IC1 to ICm. The interface circuit IIC may provide the decoder DC1 with the received data chunk DC, a payload of the received data chunk DC, or a part (e.g., a command and a key) of the payload of the received data chunk DC.

The decoder DC1 may detect an attribute ATTR of the data chunk DC from an output of the interface circuit IIC. The detected attribute ATTR may be sent to the lookup block LB.

The lookup block LB may be configured to compare the attribute ATTR with the switch table ST. According to at least one example embodiment of the inventive concepts, the lookup block LB may include a plurality of lookup circuits LC. Each of the plurality of lookup circuits LC may compare one attribute with the switch table ST. That is, the lookup block LB may compare the attribute ATTR with the switch table ST in a multi-stage structure. The lookup block LB may detect a policy P, which corresponds to the attribute ATTR, from the switch table ST and may send the detected policy P to the switch fabric SF. The switch fabric SF may also be referred to as a switched fabric or switching fabric.

The switch fabric SF may connect the interface circuit IIC with at least one of the plurality of first memory modules MOD1 to MODn, based on the policy P output from the lookup block LB.

The interface circuit IIC may send the data chunk DC to the selected at least one first memory module through the switch fabric SF.

According to at least one example embodiment of the inventive concepts, a plurality of decoder-lookup groups each of which is composed of the decoder DC1 and the lookup block LB may be provided in parallel. The decoder-lookup groups may correspond to the interface circuits IC1 to ICm, respectively, and may process data chunks DC respectively output from the interface circuits IC1 to ICm in parallel.

Figure 6:
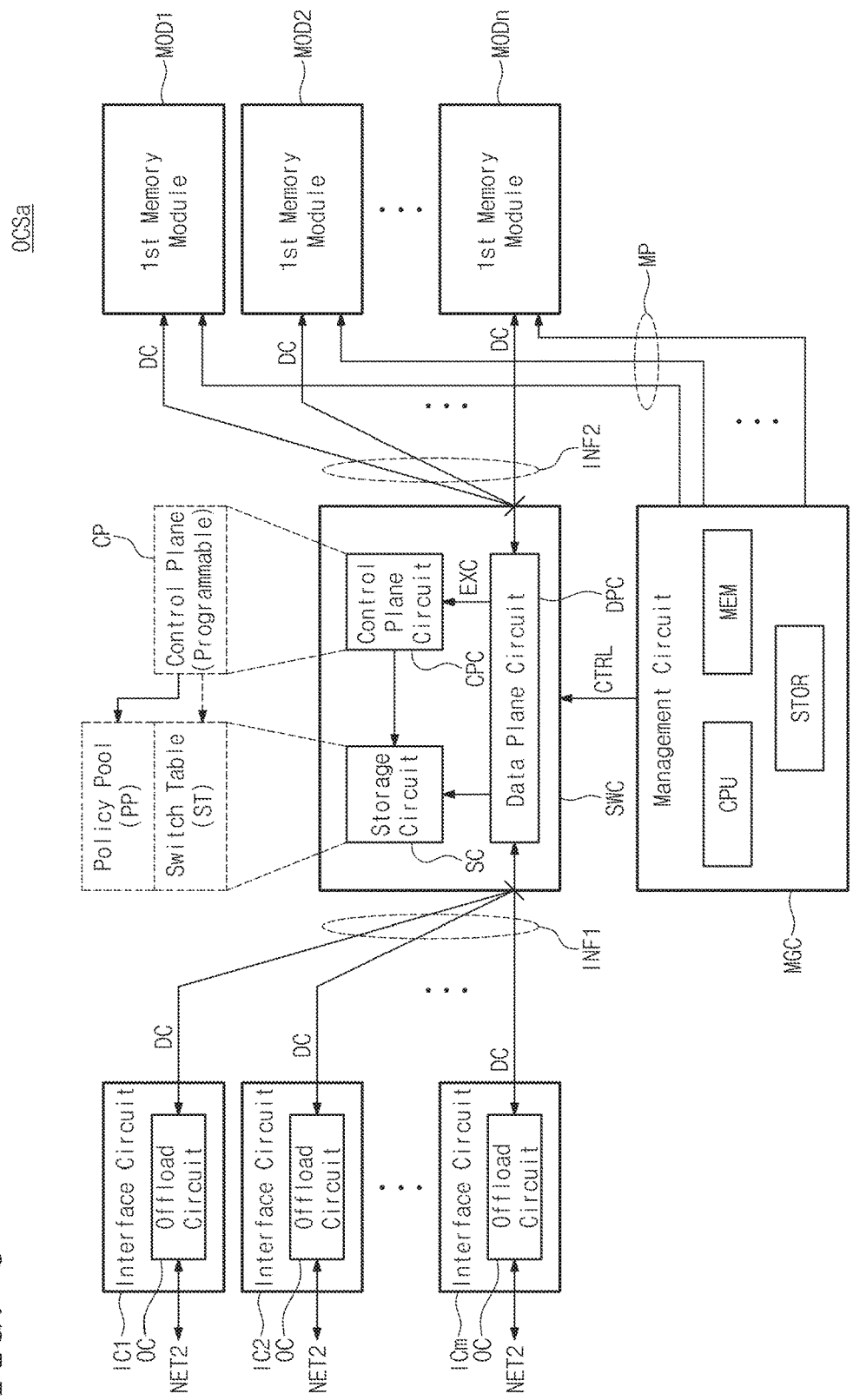
FIG. 6 is a block diagram illustrating an application of the object cache server device illustrated in FIG. 2.

FIG. 6 is a block diagram illustrating an application of the object cache server device OCS illustrated in FIG. 2. Referring to FIG. 6, the object cache server device OCSa may include the plurality of interface circuits IC1 to ICm, the switch circuit SWC, the plurality of memory modules MOD1 to MODn, and a management circuit MGC. Compared to the object cache server device OCS of FIG. 2, the object cache server device OCSa may further include the management circuit MGC.

The management circuit MGC may include a central processing unit (CPU), a main memory MEM, and a storage STOR. The management circuit MGC may monitor loads of the plurality of first memory modules MOD1 to MODn through a monitor path MP. The management circuit MGC may perform load balancing with respect to the first memory modules MOD1 to MODn, based on the monitor result. For example, the management circuit MGC may perform the load balancing by updating the switch table ST through a control path CTRL to allow the data chunk DC to be sent to a memory module, of which the load is relatively small, instead of a memory module of which the load is relatively great.

Figure 7:
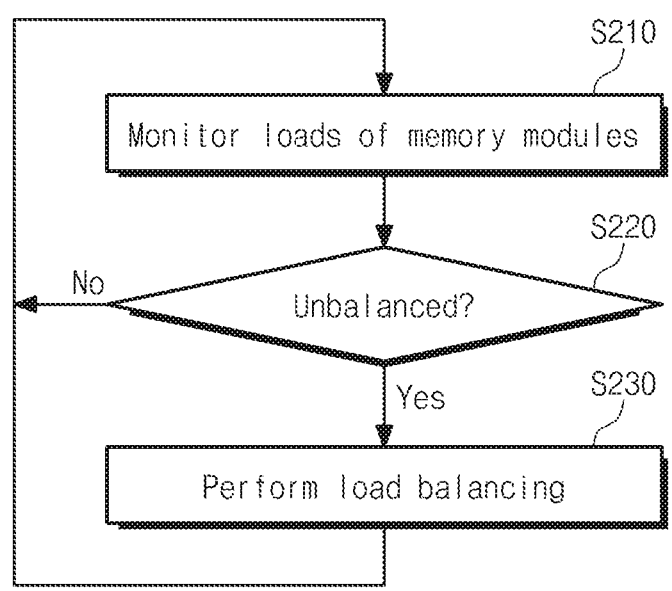
FIG. 7 is a flowchart illustrating an operating method of the object cache server device according to at least one example embodiment of the inventive concepts.

FIG. 7 is a flowchart illustrating an operating method of the object cache server device OCSa according to at least one example embodiment of the inventive concepts. According to at least one example embodiment of the inventive concepts, an operating method of the management circuit MGC is illustrated in FIG. 7. Referring to FIGS. 6 and 7, in step S210, the management circuit MGC may monitor loads of the first memory modules MOD1 to MODn.

In step S220, the management circuit MGC may determine whether the loads of the first memory modules MOD1 to MODn are unbalanced. For example, when a difference between the greatest load and the smallest load of the loads of the first memory modules MOD1 to MODn is greater than or equal to a threshold value, the loads may be determined as being unbalanced. When a difference between an average of the loads of the first memory modules MOD1 to MODn and the outermost value the most distant from the average is greater than or equal to the threshold value, the loads may be determined as being unbalanced. When a variance or a standard deviation the loads of the first memory modules MOD1 to MODn is greater than or equal to the threshold value, the loads may be determined as being unbalanced.

If the loads of the first memory modules MOD1 to MODn are unbalanced, the management circuit MGC may perform load balancing.

As described with reference to FIGS. 6 and 7, the object cache server device OCS may process the TCP/IP packet, which is received through the second network NET, in high speed based on hardware and may send the processed result to the first memory modules MOD1 to MODn. In addition, the object cache server device OCS may perform load balancing about the first memory modules MOD1 to MODn using the management circuit MGC.

Figure 8:
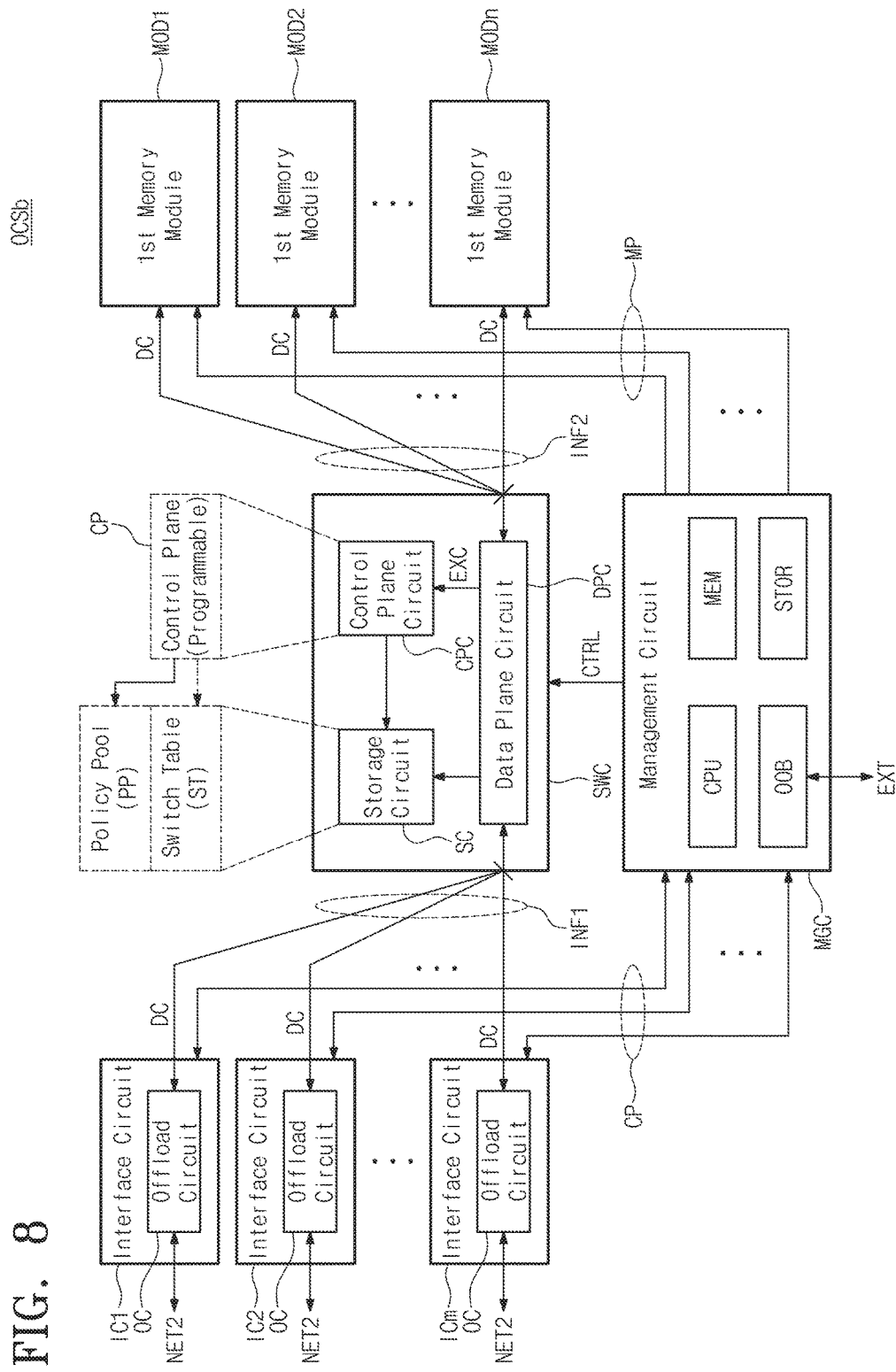
FIG. 8 is a block diagram illustrating an application of the object cache server device illustrated in FIG. 6.

FIG. 8 is a block diagram illustrating an application of the object cache server device OCSa illustrated in FIG. 6. Referring to FIG. 8, an object cache server device OCSb may include the plurality of interface circuits IC1 to ICm, the switch circuit SWC, the plurality of memory modules MOD1 to MODn, and the management circuit MGC. Compared to the object cache server device OCSa of FIG. 6, the object cache server device OCSb may further include an out-of-band interface OOB that is configured to communicate with the interface circuits IC1 to ICm through a communication path and configured to communicate with an external device EXT without passing through the interface circuits IC1 to ICm.

The management circuit MGC may communicate with the second network NET2 through the communication path CP and the interface circuits IC1 to ICm. For example, the management circuit MGC may send information about a load of the object cache server device OCSb to a switch (or a router) in the second network NET2. The management circuit MGC may share the information about the load with an external object cache server device through the second network NET2. When the load of the object cache server device OCSb is great, the management circuit MGC may forward a data chunk DC to the external object cache server device through the second network NET2. For example, the management circuit MGC may request at least one of the interface circuits IC1 to ICm to forward the data chunk DC. The interface circuits IC1 to ICm may forward the data chunk DC requested by the management circuit MGC.

The management circuit MGC may communicate with the external device EXT through the out-of-band interface OOB. The management circuit MGC may communicate with the external device EXT through the out-of-band interface OOB. The management circuit MGC may share the information about the load with the external object cache server device through the out-of-band interface OOB. The management circuit MGC may communicate with an external load management circuit through the out-of-band interface OOB. In response to control of the external load management circuit, the management circuit MGC may forward the data chunk DC to the external load management device through the interface circuits IC1 to ICm or may receive the data chunk DC from the external load management device therethrough.

According to at least one example embodiment of the inventive concepts, the switch table ST, the policy pool PP, or the control plane CP may be updated through the out-of-band interface OOB.

Figures 9, 10:
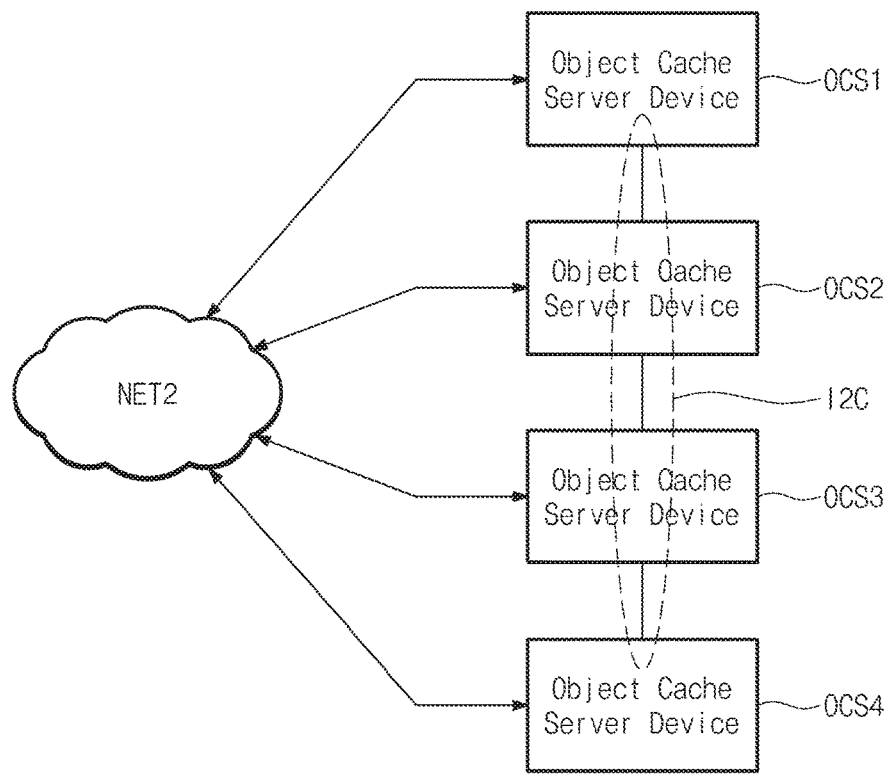
FIG. 9 is a drawing illustrating an example in which object cache server devices are interconnected through an out-of-band interface.
FIG. 10 is a table illustrating am example of loads of the object cache server devices illustrated in FIG. 9.

FIG. 9 is a drawing illustrating an example in which object cache server devices OCS1 to OCS4 are interconnected through the out-of-band interface OOB. Referring to FIG. 9, the object cache server devices OCS1 to OCS4 may be interconnected through an inter integrated circuit (I2C) interface. That is, the out-of-band interface OOB may be the I2C interface. However, the out-of-band interface OOB may not be limited thereto.

Referring to FIG. 9, according to at least one example embodiment of the inventive concepts the first to fourth object cache server devices OCS1 to OCS4 are connected to the second interface NET2 and are interconnected through the I2C interface. However, according to at least some example embodiments of the inventive concepts, the number of object cache server devices may be different than that shown in FIG. 9.

FIG. 10 is a table illustrating am example of loads of the object cache server devices OCS1 to OCS4 illustrated in FIG. 9. Referring to FIGS. 9 and 10, a load level of the first object cache server device OCS1 may be a low level. Each of load levels of the second and third object cache server devices OCS2 and OCS3 may be a medium level. A load level of the fourth object cache server device OCS4 may be a high level.

The first to fourth object cache server devices OCS1 to OCS4 may share load information through the second interface NET2 or the I2C interface. For example, each of the first to fourth object cache server devices OCS1 to OCS4 may have load information illustrated in FIG. 10.

Figures 11, 12:
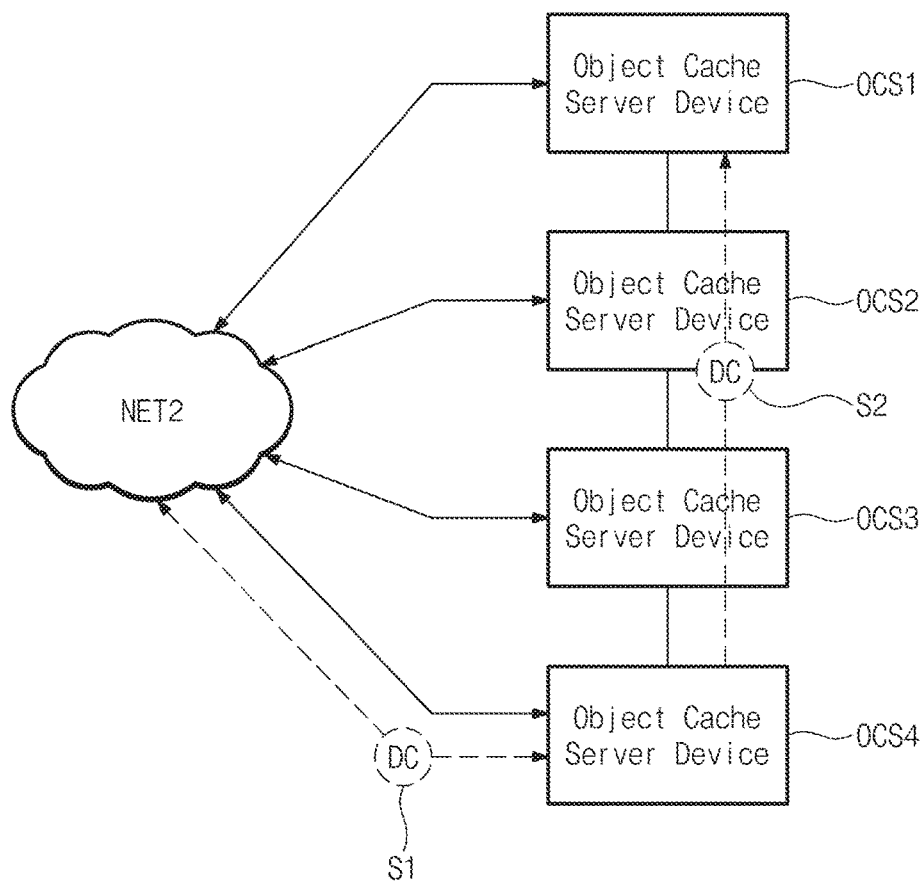
FIG. 11 is a drawing illustrating an example in which the object cache server devices of FIG. 9 forward a data chunk.
FIG. 12 is a drawing illustrating an example of a replacement table that is created when a data chunk is forwarded.

FIG. 11 is a drawing illustrating an example in which the object cache server devices OCS1 to OCS4 of FIG. 9 forward a data chunk. Referring to FIGS. 9 to 11, in step S1, a data chunk DC may be transmitted to the fourth object cache server device OCS4 through the second network NET2.

As illustrated in FIG. 10, a load level of the fourth object cache server device OCS4 may be a high level. In step S2, the fourth object cache server device OCS4 may forward the received data chunk DC to another object cache server device. For example, the fourth object cache server device OCS4 may forward the data chunk DC through the I2C interface to the first object cache server device OCS1 having the lowest load level.

For example, when a switch (or router) of the second network NET2 supports a forward of the object cache server devices OCS1 to OCS4, the fourth object cache server device OCS4 may send a message, which provides notification that the data chunk DC is forwarded, to the switch (or router) of the second network NET2. The switch (or router) of the second network NET2 may update a target IP address or a target port based on the received message, and thus the data chunk DC may be determined as being stored in the first object cache server device OCS1.

As another example, the fourth object cache server device OCS4 may create and manage a replacement table that indicates that a data chunk DC is forwarded to the first object cache server device OCS1.

FIG. 12 is a drawing illustrating an example of a replacement table RT that is created when a data chunk DC is forwarded. Referring to FIG. 12, the replacement table RT may include information that is associated with a key included in a payload of a data chunk DC, a source device of a forward, and a target (or destination) device of the forward.

For example, a key of a forwarded data chunk DC may be "IMM," a source may be the fourth object cache server device OCS4, and a target may be the first object cache server device OCS1.

When a data chunk DC having a key of "IMM" is provided to the fourth object cache server device OCS4 after the replacement table RT is created, the fourth object cache server device OCS4 may forward the data chunk DC to the first object cache server device OCS1.

According to at least one example embodiment of the inventive concepts, the replacement table RT may be created on the fourth object cache server device OCS4 (e.g., by the fourth object cache server device OCS4) as a source of a forward. The replacement table RT may be shared by the fourth object cache server device OCS4 as the source of the forward and the first object cache server device OCS1 as a target of the forward. The replacement table RT may be shared by the first to fourth object cache server devices OCS1 to OCS4 that share the second network NET2.

Figure 13:
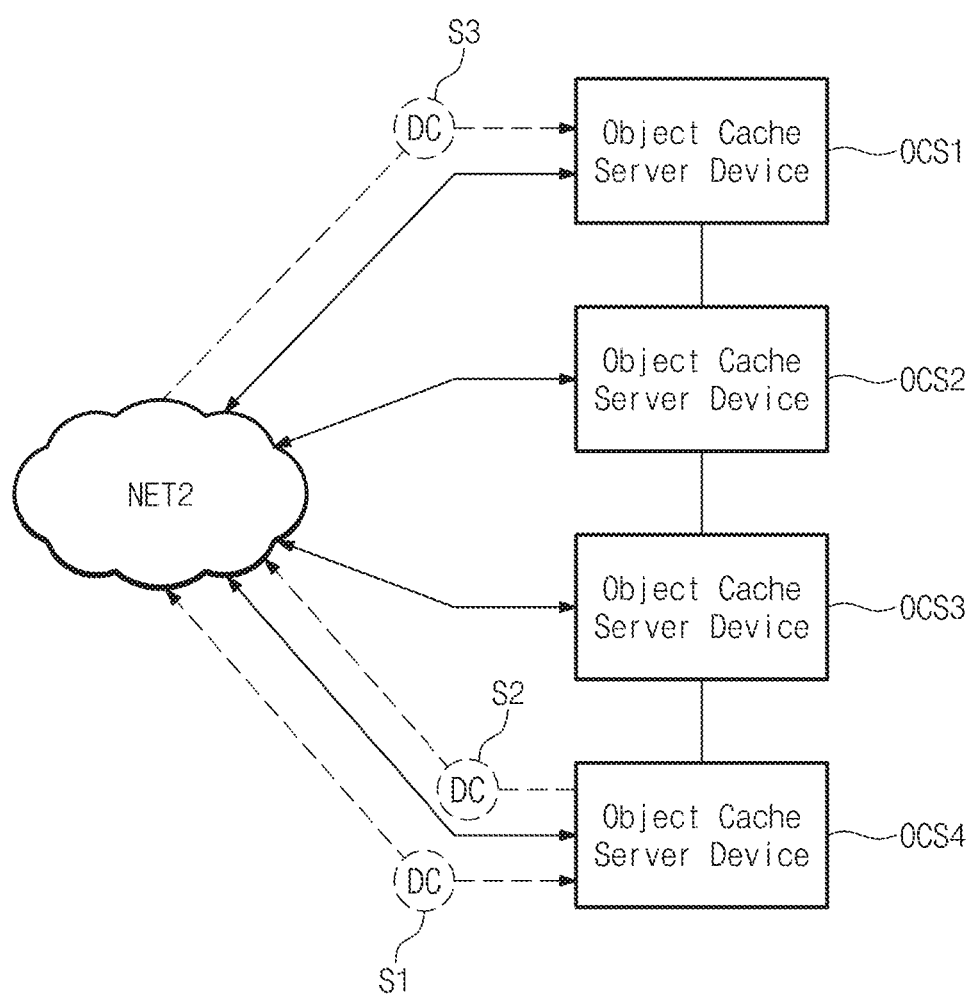
FIG. 13 is a drawing illustrating an example in which the object cache server devices of FIG. 9 forward a data chunk.

FIG. 13 is a drawing illustrating an example in which the object cache server devices OCS1 to OCS4 of FIG. 9 forward a data chunk. Referring to FIGS. 9, 10, and 13, in step S1, a data chunk DC may be transmitted to the fourth object cache server device OCS4 through the second network NET2.

As illustrated in FIG. 10, a load level of the fourth object cache server device OCS4 may be a high level. The fourth object cache server device OCS4 may forward the received data chunk DC to another object cache server device. For example, the fourth object cache server device OCS4 may set the first object cache server device OCS1, which has the lowest load level, as a target and may send the data chunk DC to the second network NET2 in step S2. In step S3, the data chunk DC may be sent to the first object cache server device OCS1 through the second network NET2.

For example, when a switch (or router) of the second network NET2 supports a forward of the object cache server devices OCS1 to OCS4, the fourth object cache server device OCS4 may send a message, which provides notification that the data chunk DC is forwarded, to the switch (or router) of the second network NET2. The switch (or router) of the second network NET2 may update a target IP address or a target port based on the received message, and thus the data chunk DC may be determined as being stored in the first object cache server device OCS1.

As another example, as illustrated in FIG. 12, the fourth object cache server device OCS4 may create and manage a replacement table that indicates that a data chunk DC is forwarded to the first object cache server device OCS1.

Figure 14:
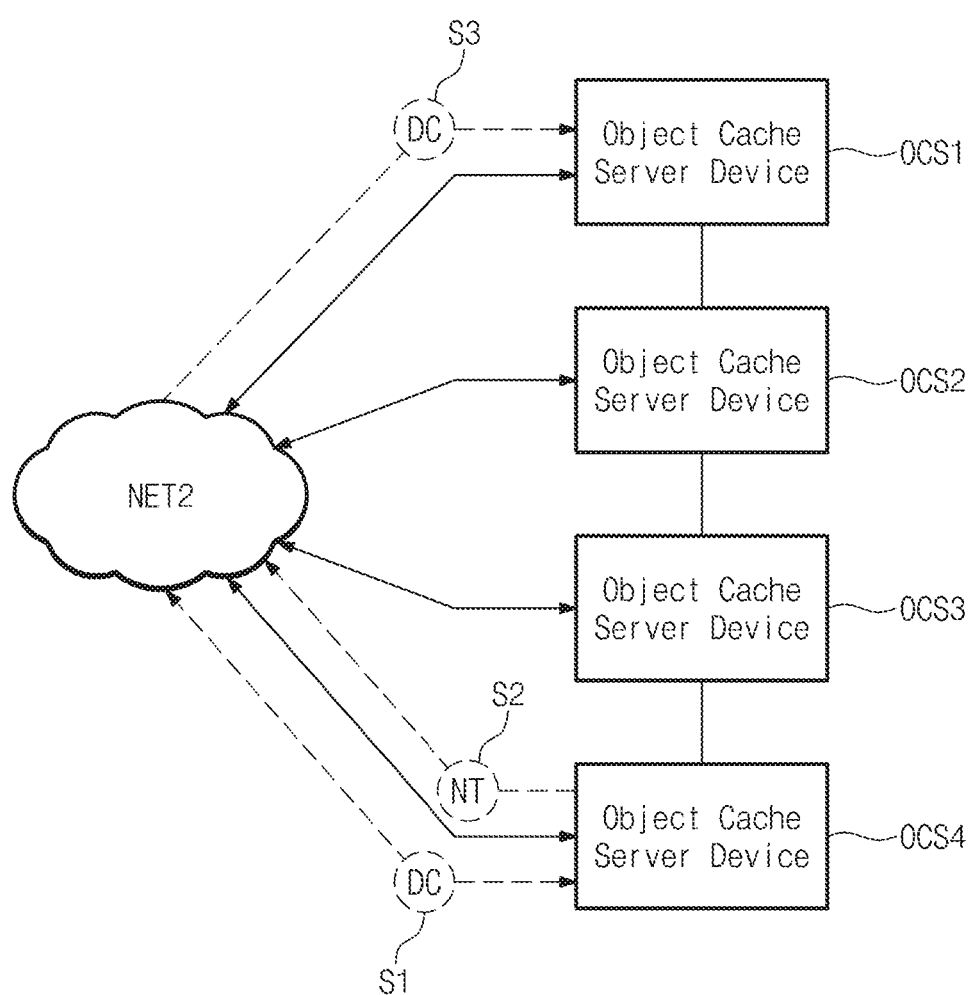
FIG. 14 is a drawing illustrating an example in which the object cache server devices of FIG. 9 perform a load report.

FIG. 14 is a drawing illustrating an example in which the object cache server devices of FIG. 9 perform a load report. Referring to FIGS. 9, 10, and 14, in step S1, a data chunk DC may be transmitted to the fourth object cache server device OCS4 through the second network NET2.

In step S2, the fourth object cache server device OCS4 may send a load report message NT to the second network NET2. The load report message NT may include information for requesting the second network NET to forward the data chunk DC to the first object cache server device OCS1. The load report message NT may include a table described with reference to FIG. 10.

In step S3, the second network NET2 may send the data chunk DC to the first object cache server device OCS1 with reference to the load report message NT again.

Figure 15:
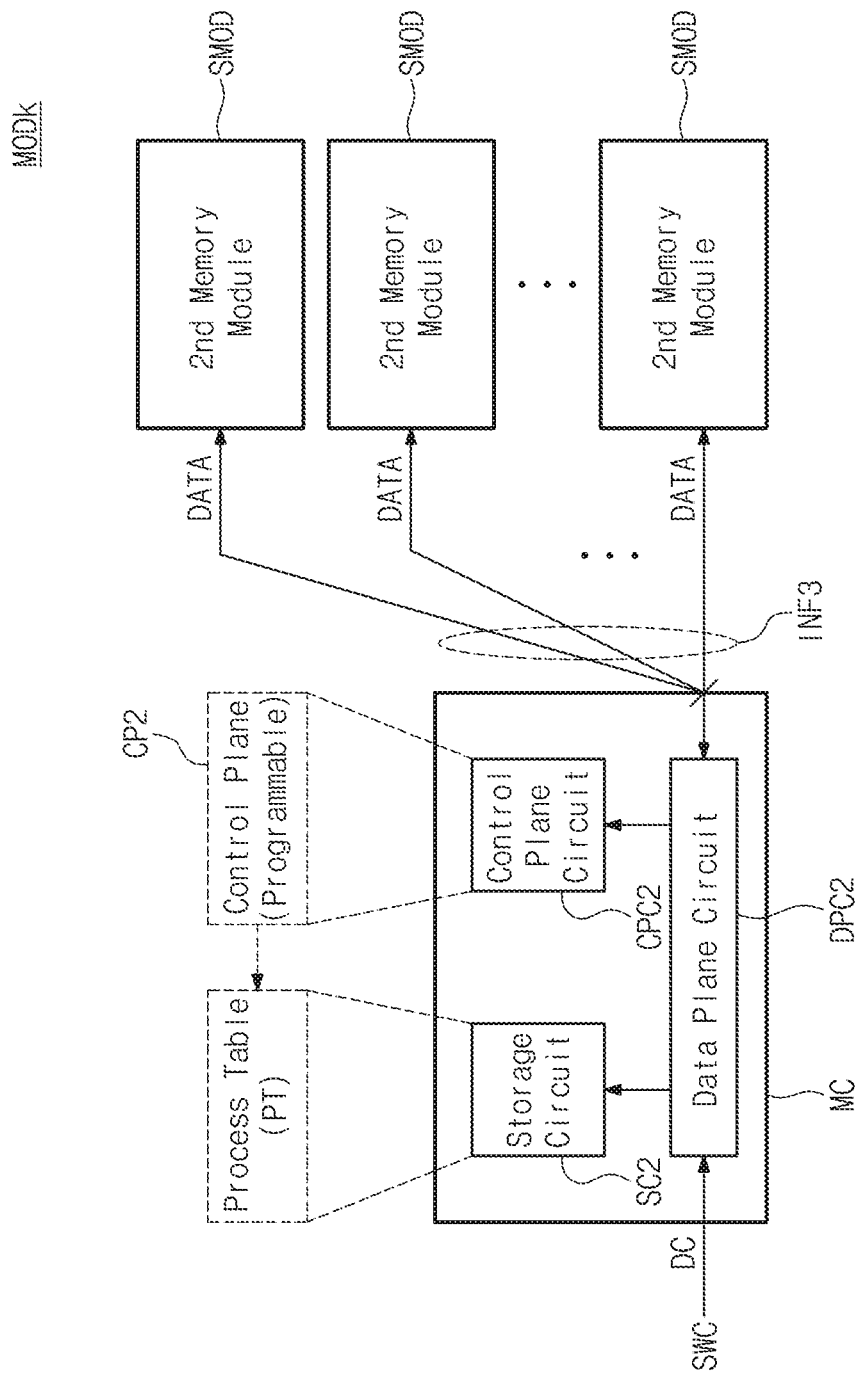
FIG. 15 is a block diagram illustrating a first memory module MODk according to at least one example embodiment of the inventive concepts.

FIG. 15 is a block diagram illustrating a first memory module MODk according to at least one example embodiment of the inventive concepts. According to at least one example embodiment of the inventive concepts, MODk of FIG. 15 is an example of one of the first memory modules MOD1 to MODn of FIG. 2.

Referring to FIG. 15, the first memory module MODk may include a plurality of second memory modules SMOD and a memory controller MC. Each of the plurality of second memory modules SMOD may include a plurality of memory devices.

The memory controller MC may be configured to control the plurality of second memory modules SMOD through a third interface INF3. For example, the memory controller MC may decode a data chunk DC. Based on the decoded result, the memory controller MC may send data to the plurality of second memory modules SMOD or may receive data from the plurality of second memory modules SMOD.

For example, the third interface INFC may be a dual in-line memory module (DIMM) interface.

The memory controller MC may include a data plane circuit DPC2, a storage circuit SC2, and a control plane circuit CPC2.

The data plane circuit DPC2 may receive a data chunk DC from the switch circuit SWC. The data plane circuit DPC2 may decode the data chunk DC. Based on the decoded result and a process table PT stored in the storage circuit SC2, the data plane circuit DPC2 may write data at a memory module selected from the second memory modules MOD2 or may read data from the selected memory module.

The storage circuit SC2 may store the process table PT. The process table PT may include information about a method in which the data plane circuit DPC2 processes a data chunk DC.

The control plane circuit CPC2 may be configured to drive a programmable control plane CP2. The control plane CP2 may process an exception when the exception occurs on the data plane circuit DPC2. To process the exception, the control plane CP2 may update the process table PT.

According to at least one example embodiment of the inventive concepts, the first memory module MODk may support the updating of the process table PT or the updating of an algorithm of the control plane CP2. As described with reference to FIG. 1 or 8, the process table PT or the control plane CP2 may be updated through the plurality of interface circuits IC1 to ICm or through the out-of-band interface OOB.

As described above, in the first memory module MODk, the decoding of the data chunk DC and an access of the second memory modules SMOD may be performed by the data plane circuit DPC2, thereby improving an operating speed of the first memory module MODk. The exception that occurs on the data plane circuit DPC2 may be processed by the control plane CP2 that is driven on the control plane circuit CPC2.

The data plane circuit DPC2 may process operations associated with writing or reading of the data chunk DC. Policies that are used when the data plane circuit DPC2 performs operations associated with reading or writing may be written in the process table PT. For example, are in the process table PT stored the following: a policy in which when a data chunk DC is written, the data plane circuit DPC2 determines whether to allocate a storage space of the second memory module SMOD and a policy in which the data plane circuit DPC2 determines whether to select a storage space when performing garbage collection for management of the storage space of the first memory module SMOD. The process table PT may be updated by the control plane CP2.

According to at least some example embodiments of the inventive concepts, data processing may all be performed by the data plane circuit DPC2, thereby improving an operating speed of the first memory module MODk. In addition, the exception that the data plane circuit DPC2 is not capable of processing may be processed by the control plane CP2, and thus complex processing about various exceptions may be possible. The control plane CP2 may be implemented by software and may be updatable. As such, changes such as a format change of a data chunk DC, addition of a command CMD, or addition of a policy about an additional exception may be accomplished by updating the control plane CP2. For example, according to at least some example embodiments of the inventive concepts, the control plane circuit CPC2 may be or include a processor that executes computer-readable instructions (e.g., instructions included in software and/or firmware stored in such a manner as to be accessible by the control plane circuit CPC) to implement operations described herein as being performed by the control plane CP2.

This may mean that flexibility of the first memory module MODk is improved. In addition, because the debugging of the control plane CP2 is possible, the reliability of the first memory module MODk may be improved. As the process table PT is updated by the control plane CP2, flexibility to determine a policy of a data plane may increase.

Figure 16:
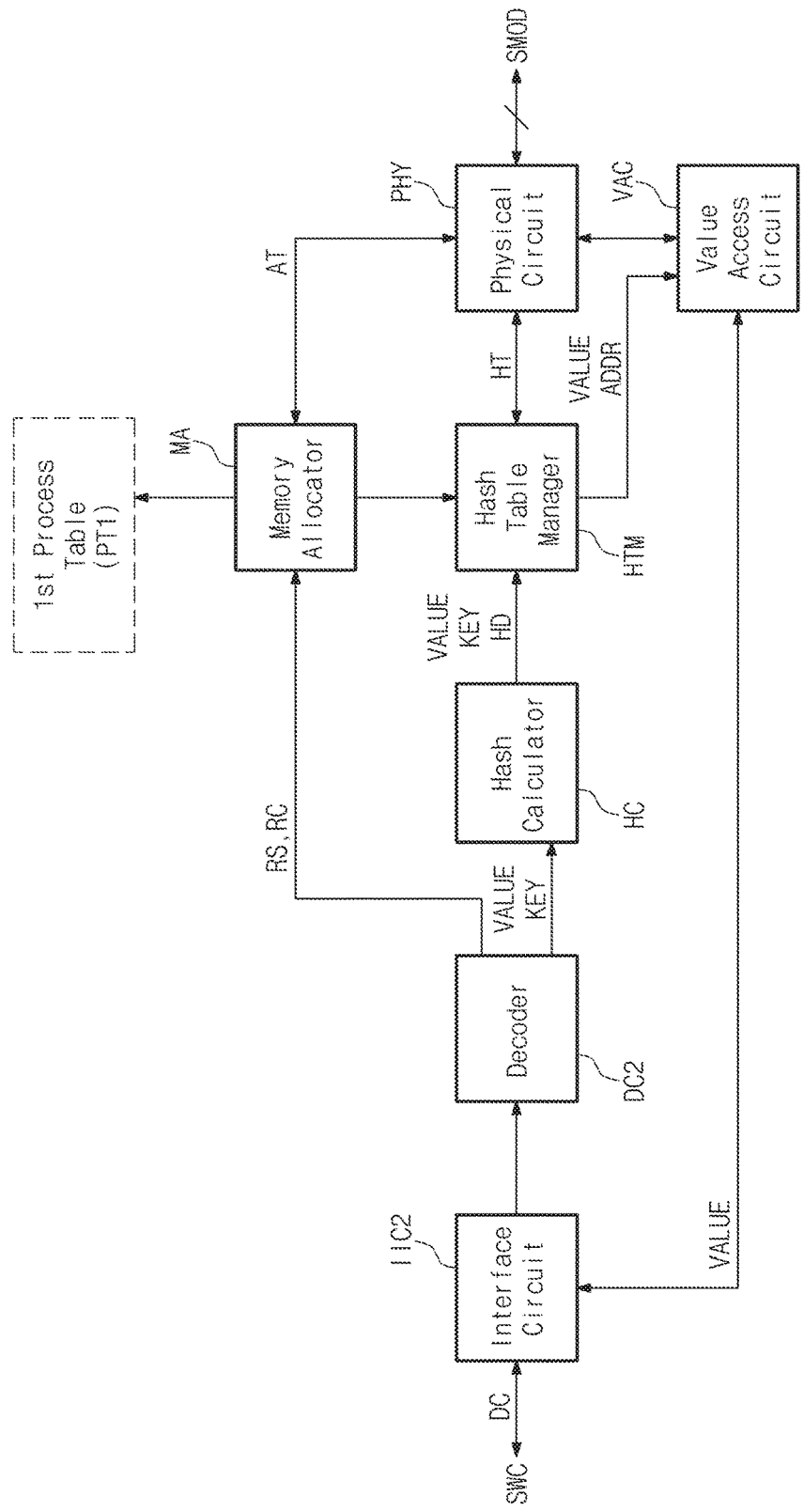
FIG. 16 is a block diagram illustrating a data plane circuit according to at least one example embodiment of the inventive concepts.

FIG. 16 is a block diagram illustrating the data plane circuit DPC2 according to at least one example embodiment of the inventive concepts. Referring to FIGS. 15 and 16, the data plane circuit DPC2 may include an interface circuit IIC2, a decoder DC2, a hash calculator HC, a memory allocator MA, a hash table manager HTM, a physical circuit PHY, and a value access circuit VAC. According to at least some example embodiments of the inventive concepts, hash table manager HTM may be embodied by a circuit or circuitry.

The interface circuit IIC2 may receive a data chunk DC from the switch circuit SWC or may output a data chunk DC to the switch circuit SWC. For example, during a write operation, the interface circuit IIC2 may receive a data chunk DC, which includes a key, a value, and a command CMD, from the switch circuit SWC. The data plane circuit DPC2 may perform a write operation based on the received data chunk DC. During a read operation, the interface circuit IIC2 may receive a data chunk DC, which includes a key and a command CMD, from the switch circuit SWC. The data plane circuit DPC2 may get the value from the second memory module SMOD based on the received data chunk DC. The interface circuit IIC2 may generate a data chunk DC that includes the key and the get value and may send the generated data chunk DC to the switch circuit SWC. According to at least one example embodiment of the inventive concepts, the interface circuit IIC2 may communicate with the switch circuit SWC based on the PCIe interface.

The interface circuit IIC2 may receive a value from the value access circuit VAC. During a write operation, the interface circuit IIC2 may output data, which includes a key, a value, and a command CMD, to the decoder DC2. During a read operation, the interface circuit IIC2 may output data, which includes a key and a command CMD, to the decoder DC2.

During the read operation, the decoder DC2 may decode the data received from the interface circuit IIC2 to extract the key and the command CMD. The decoder DC2 may output the extracted key to the hash calculator HC.

During the write operation, the decoder DC2 may decode the data received from the interface circuit IIC2 to extract the key, the value, and the command CMD. The decoder DC2 may output the extracted key and value to the hash calculator HC. The decoder DC2 may generate a request size RS or the request size RS and a request count RC from the value and may output the request size RS or the request count RC to the memory allocator MA. The request size RS and the request count RC will be described in detail with reference to FIGS. 17 to 26.

The hash calculator HC may receive the key or the key and value from the decoder DC2. The hash calculator HC may generate hash data HD by performing a hash operation with respect to the key. For example, the hash calculator HC may perform a full hash operation or a partial hash operation with respect to the received key. The hash calculator HC may output either hash data HD and the key or the hash data HD, the key, and the value to the hash table manager HTM.

The memory allocator MA may receive the request size RS and the request count RC from the decoder DC2. The memory allocator MA may control the physical circuit PHY so as to read an address table AT from one, which corresponds to the request size RS, from among the plurality of second memory modules SMOD. The memory allocator MA may allocate an address ADDR of the selected second memory module based on a first process table PT1 stored in the storage circuit SC2, the request size RS, and the request count RC. For example, the request size RS and the request count RC may indicate a storage space for a write operation. The first process table PT1 may include information about the second memory module including the storage space to be allocated and information for selecting a memory device in the second memory module. The memory allocator MA may allocate a storage space, which is requested by the request size RS and the request count RC, based on a policy of the first process table PT1 and may output the address of the allocated storage space to the table manager HTM.

During a write operation, the hash table manager HTM may receive a key, hash data, and a value from the hash calculator HC. The hash table manager HTM may receive the address ADDR from the memory allocator MA. The hash table manager HTM may control the physical circuit PHY so as to update a hash table HT stored in one, which the hash data HD indicates, from among the plurality of second memory modules SMOD. For example, the hash table manager HTM may add a correspondence between the key and the address ADDR to the hash table HT. The hash table manager HTM may output the address ADDR and the value to the value access circuit VAC.

During a read operation, the hash table manager HTM may receive a key and hash data from the hash calculator HC. The hash table manager HTM may control the physical circuit PHY so as to read the hash table HT of one, which the hash data HD indicates, from among the plurality of second memory modules SMOD. The hash table manager HTM may detect the address ADDR corresponding to the key based on the hash table HT. The hash table manager HTM may output the detected address ADDR to the value access circuit VAC.

During a write operation, the value access circuit VAC may receive the address ADDR and the value from the hash table manager HTM. The value access circuit VAC may write the value at a memory module selected from the second memory modules SMOD, based on the address ADDR.

During a read operation, the value access circuit VAC may receive the address ADDR from the hash table manager HTM. The value access circuit VAC may read a value from a memory module selected from the second memory modules SMOD, based on the address ADDR.

The physical circuit PHY may access the plurality of second memory modules SMOD. For example, the physical circuit PHY may control the second memory modules SMOD based on the DIMM interface.

Figure 17:
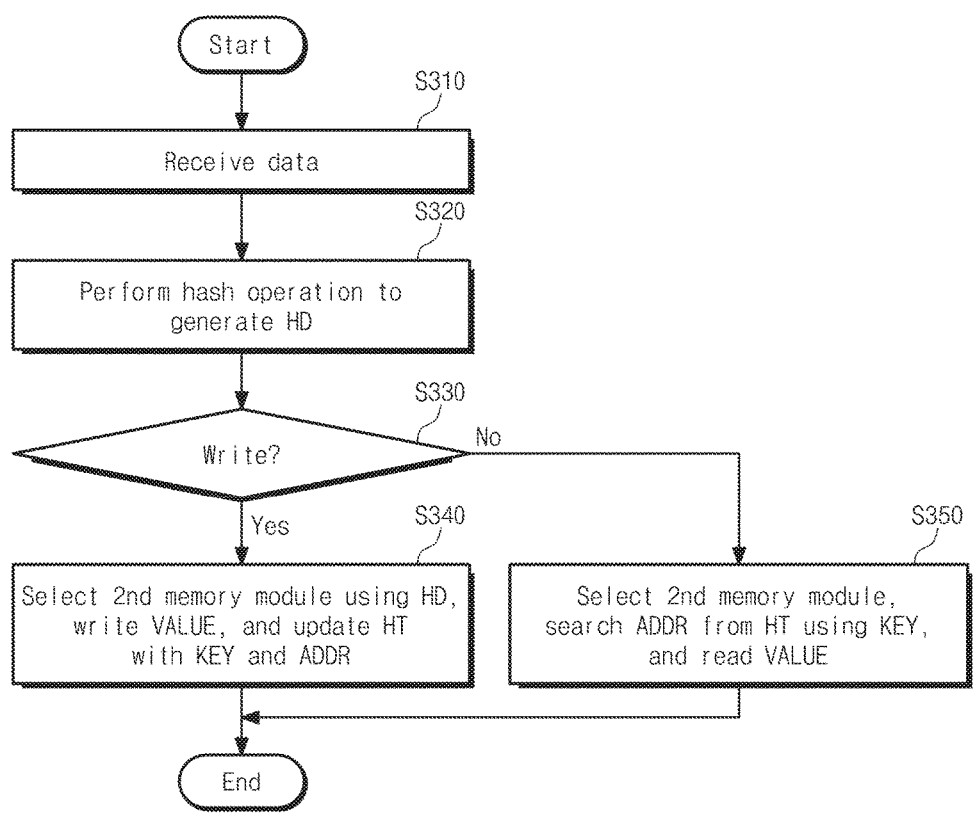
FIG. 17 is a flowchart illustrating an operating method of a data plane circuit according to at least one example embodiment of the inventive concepts.

FIG. 17 is a flowchart illustrating an operating method of the data plane circuit DPC2 according to at least one example embodiment of the inventive concepts. Referring to FIGS. 16 and 17, in step S310, the data plane circuit DPC2 may receive data from the switch circuit SWC. For example, the data plane circuit DPC2 may receive data that includes a key or the key and a value.

In step S320, the data plane circuit DPC2 may generate hash data HD by performing a hash operation with respect to the key.

In step S330, the data plane circuit DPC2 may perform the following operation based on whether an operation is a write operation or a read operation. In the case of the write operation, in step S340, the data plane circuit DPC2 may select a second memory module using the hash data HD, may allocate an address, may write the value, and may update the hash table HT with the key and the address ADDR. In the case of the read operation, in step S350, the data plane circuit DPC2 may select a second memory module using the hash data HD, may search for the address ADDR from the hash table HT using the key, and may read the value.

When a corresponding key is absent in the hash table HT, that is, when the searching for the address ADDR fails, the interface circuit IIC2 may perform an operation, which is defined by the object cache protocol, for example, "not found" response transmission.

Figure 18:
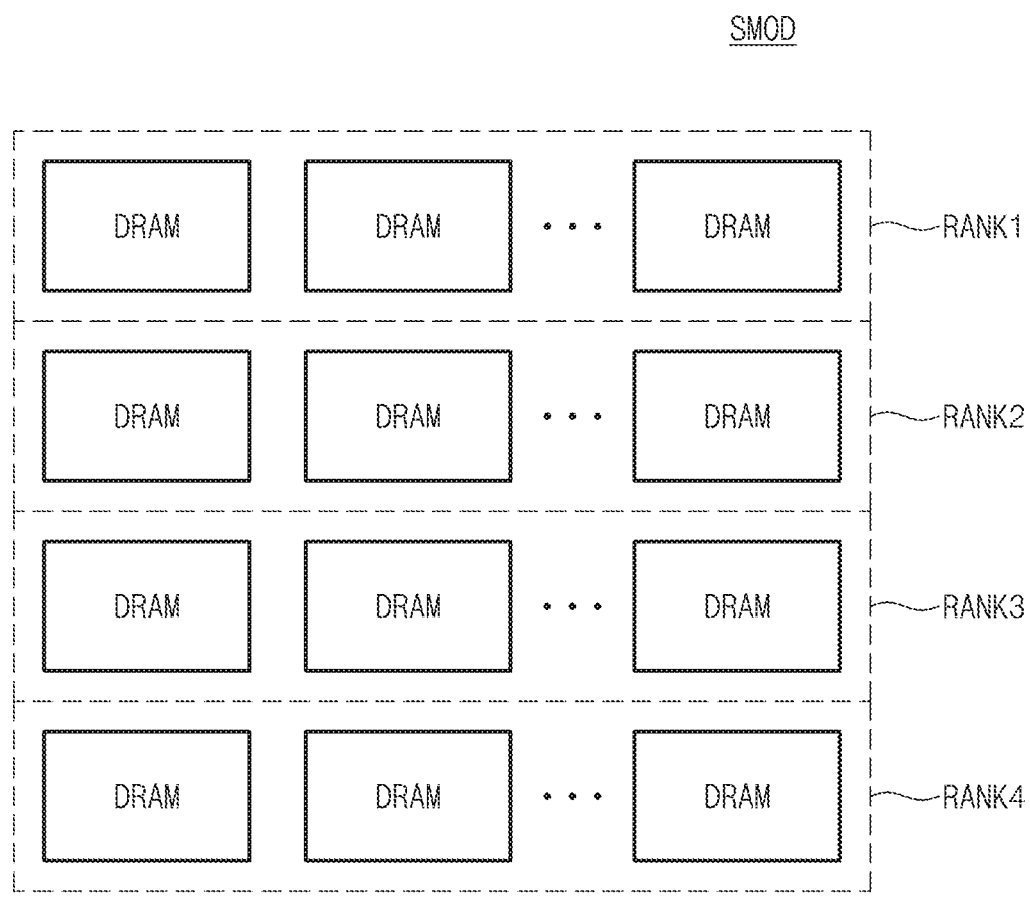
FIG. 18 is a block diagram illustrating a second memory system according to at least one example embodiment of the inventive concepts.

FIG. 18 is a block diagram illustrating the second memory module SMOD according to at least one example embodiment of the inventive concepts. Referring to FIGS. 15 and 18, the second memory module SMOD may include a plurality of memory devices DRAM. Each of the plurality of memory devices DRAM may include a dynamic random access memory. However, a kind of memory devices DRAM may be limited thereto.

The plurality of memory devices DRAM may form first to fourth ranks RANK1 to RANK4. The first to fourth ranks RANK1 to RANK4 may be accessed by the memory controller MC independently of each other. Memory devices DRAM that belong to a selected rank may be accessed by the memory controller MC in parallel and at the same time. The memory devices that form the first to fourth ranks RANK1 to RANK4 may have the same structure and the same property. For example, the memory devices DRAM may be homogeneous memory devices. For descriptive convenience, it may be assumed that the memory devices DRAM form the first to fourth ranks RANK1 to RANK4. However, the number of ranks may not be limited thereto.

Figure 19:
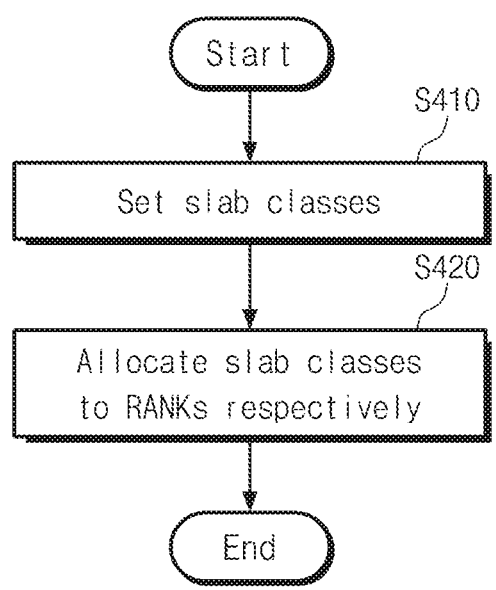
FIG. 19 is a flowchart illustrating a method in which a memory allocator organizes first to fourth ranks.

FIG. 19 is a flowchart illustrating a method in which the memory allocator MA organizes the first to fourth ranks RANK1 to RANK4. According to at least one example embodiment of the inventive concepts, the organization of FIG. 19 may be performed in initializing the object cache server device OCS or when the object cache server device OCS is reconfigured according to an external request.

Referring to FIGS. 1, 16, and 19, in step S410, the control circuit 210 may set slab classes. For example, each of the slab classes may include homogeneous slabs of which the sizes are equal to each other. Each of different slab classes may include heterogeneous slabs of which the sizes are different from each other. Each slab may be a basic unit that is allocated to write data, for example, a value.

For example, the memory allocator MA may select a first size of a slab. The memory allocator MA may form a first slab class with slabs each of which has the first size. The memory allocator MA may select a form factor. For example, the memory allocator MA may select the form factor of "2." The memory allocator MA may select a second size by multiplying the form factor to the first size. The memory allocator MA may form a second slab class with slabs each of which has the second size. Likewise, the memory allocator MA may select a k-th size by multiplying the form factor to a (k−1)-th size. The memory allocator MA may form a k-th slab class with slabs each of which has the k-th size. The form factor and the number of slab classes may be adjusted, not limited thereto.

In step S420, the memory allocator MA may allocate the slab classes to the ranks RANK1 to RANK4, respectively. For example, the memory allocator MA may allocate one slab class to one rank or two more ranks. As another example, the memory allocator MA may allocate one slab class or two or more slab classes to one rank.

According to at least one example embodiment of the inventive concepts, a correspondence between ranks and slab classes SC may be stored as the first process table PT1 in the storage circuit SC2. For example, the memory allocator MA may set the ranks and the slab classes SC based on the first process table PT1. The memory allocator MA may allocate an address ADDR based on the first process table PT1.

Figure 20:
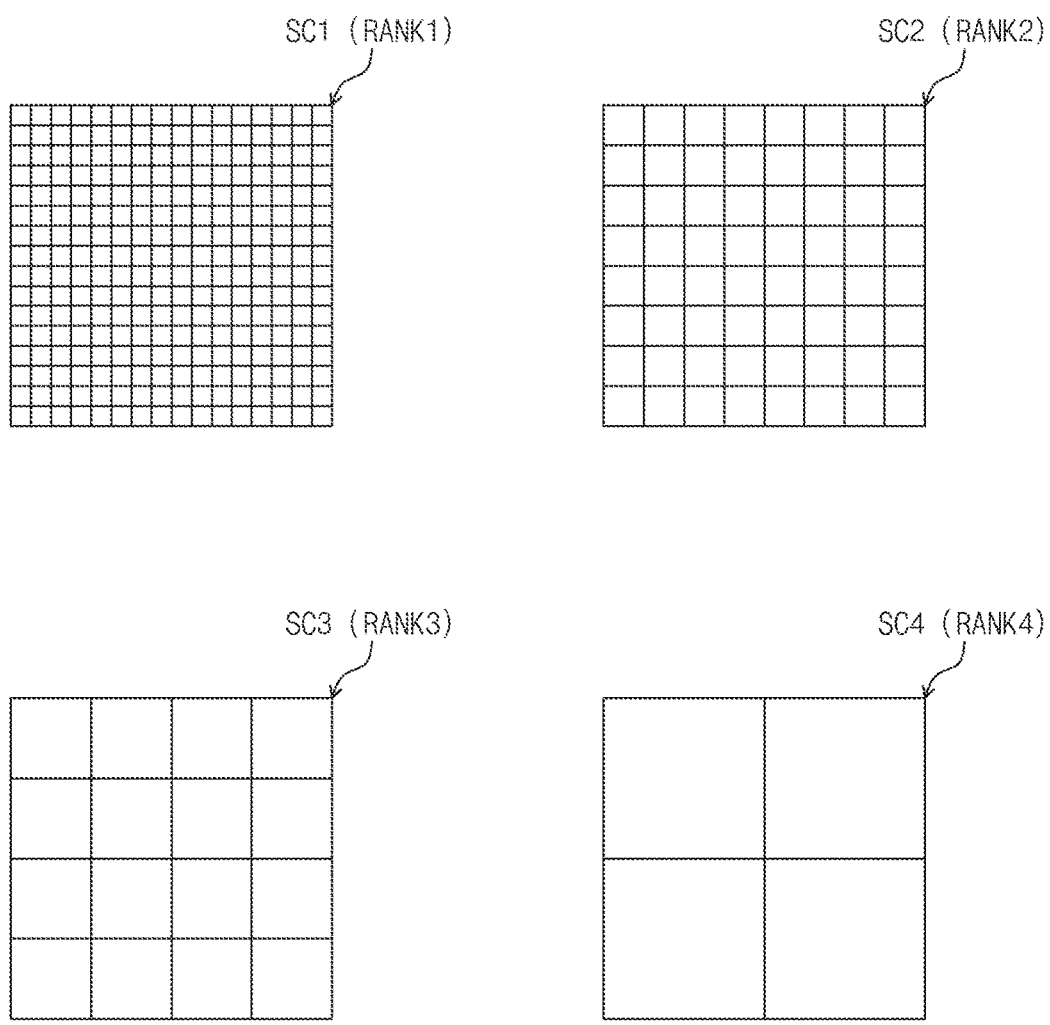
FIG. 20 is a drawing illustrating an example in which the memory allocator organizes the first to fourth ranks based on first to fourth slab classes.

FIG. 20 is a drawing illustrating an example in which the memory allocator MA organizes the first to fourth ranks RANK1 to RANK4 based on first to fourth slab classes. According to at least one example embodiment of the inventive concepts, the case that one slab class belongs to one slab class is illustrated in FIG. 20.

Referring to FIG. 20, the first slab class SC1 may be allocated to the first rank RANK1. The second slab class SC2 may be allocated to the second rank RANK2. The third slab class SC3 may be allocated to the third rank RANK3. The fourth slab class SC4 may be allocated to the fourth rank RANK4.

According to at least one example embodiment of the inventive concepts, the memory allocator MA may allocate different slab classes to different ranks. That is, the memory allocator MA may separate accesses of different slab classes independently of each other.

The case that one slab class corresponds to one rank is illustrated in FIG. 20. However, at least some example embodiments of the inventive concepts are not be limited to the examples shown in FIG. 20. For example, one slab class may be allocated to a plurality of ranks. As another example, two or more slab classes may be allocated to one rank. In this case, two or more slab classes that are allocated to one rank may be slab classes that are the most adjacent to each other. For example, (k−1)-th and k-th slab classes that are the most adjacent to each other may be allocated to one rank.

Figure 21:
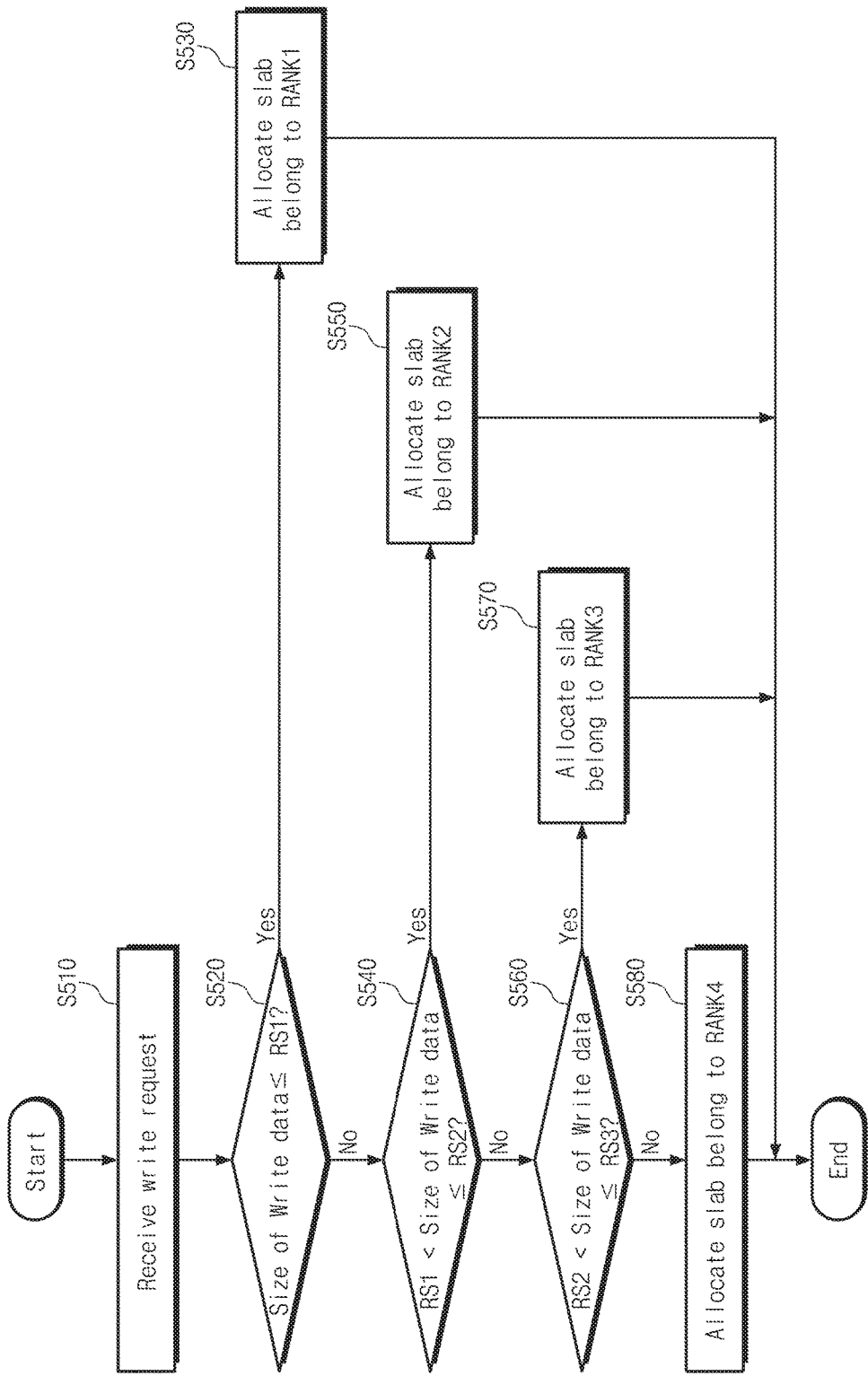
FIG. 21 is a flowchart illustrating a method in which the memory allocator allocates a slab to write data.

FIG. 21 is a flowchart illustrating a method in which the memory allocator MA allocates a slab to write data. Referring to FIGS. 15, 16, 20, and 21, in step S510, the memory allocator MA may receive the request size RS and the read count RC.

In step S520, the memory allocator MA may determine whether the request size RS is smaller than or equal to a first reference size RS1. For example, the first reference size RS1 may be the size of each slab of the first slab class SC1.

If the request size RS is smaller than or equal to the first reference size RS1, in step S530, the memory allocator MA may allocate a slab belonging to the first rank RANK1, that is, a slab of the first slab class SC1 to the write data. For example, the memory allocator MA may allocate slabs, of which the number corresponds to the request count RC, in the first slab class SC1. If the request size RS is greater than the first reference size RS1, the process may proceed to step S540.

In step S540, the memory allocator MA may determine whether the request size RS is greater than the first reference size RS1 and smaller than or equal to a second reference size RS2. For example, the second reference size RS2 may be the size of each slab of the second slab class SC2.

If the request size RS is greater than the first reference size RS1 and smaller than or equal to the second reference size RS2, in step S550, the memory allocator MA may allocate a slab belonging to the second rank RANK2, that is, a slab of the second slab class SC2 to the write data. For example, the memory allocator MA may allocate slabs, of which the number corresponds to the request count RC, in the second slab class SC2. If the request size RS is greater than the second reference size RS2, the process may proceed to step S560.

In step S560, the memory allocator MA may determine whether the request size RS is greater than the second reference size RS2 and smaller than or equal to a third reference size RS3. For example, the second reference size RS3 may be the size of each slab of the third slab class SC3.

If the request size RS is greater than the second reference size RS2 and smaller than or equal to the third reference size RS3, in step S570, the memory allocator MA may allocate a slab belonging to the third rank RANK3, that is, a slab of the third slab class SC3 to the write data. For example, the memory allocator MA may allocate slabs, of which the number corresponds to the request count RC, in the third slab class SC3.

If the request size RS is greater than the third reference size RS3, the process may proceed to step S580. In step S580, the memory allocator MA may allocate a slab belonging to the fourth rank RANK4, that is, a slab of the fourth slab class SC4 to the write data. For example, the memory allocator MA may allocate slabs, of which the number corresponds to the request count RC, in the fourth slab class SC4.

That is, the memory allocator MA may allocate different slab classes to different ranks. That is, different ranks may be accessed when different slab classes are accessed.

In the key-value store based data structure, an access frequency may vary according to the size of a value. That is, an access frequency may vary for each slab class. The memory controller MC according to at least one example embodiment of the inventive concepts may separate different slab classes to different ranks. Accordingly, in the memory controller MC according to at least one example embodiment of the inventive concepts, an access frequency may vary for each rank, and a rank of which the access frequency is relatively low may enter a power saving mode. This may mean that power consumption of the object cache server device OCS is reduced.

Figure 22:
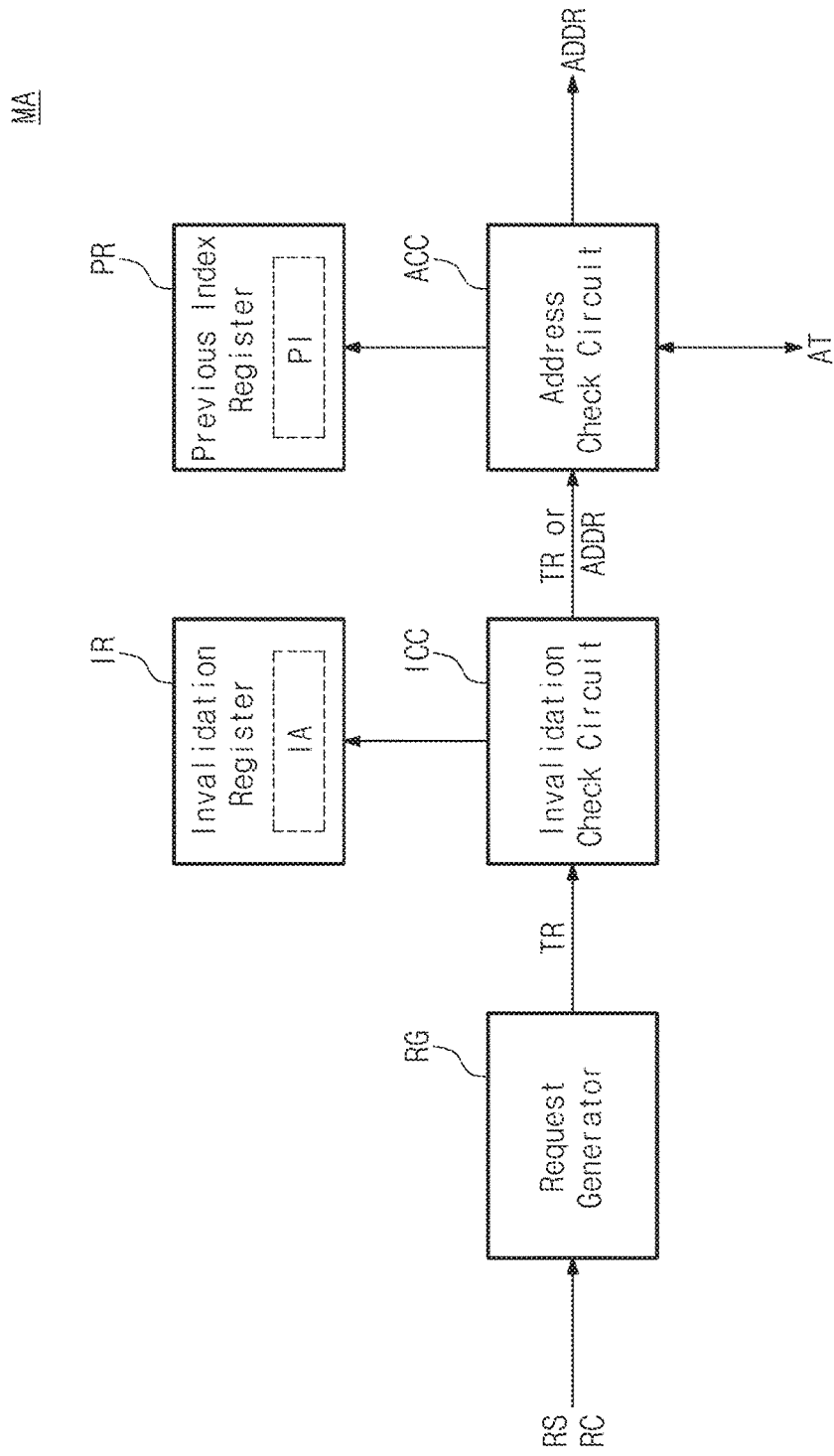
FIG. 22 is a block diagram illustrating the memory allocator according to at least one example embodiment of the inventive concepts.

FIG. 22 is a block diagram illustrating the memory allocator MA according to at least one example embodiment of the inventive concepts. Referring to FIGS. 15, 16, 20, and 23, the memory allocator MA may include a request generator RG, an invalidation check circuit ICC, an invalidation register IR, an address check circuit according to at least one example embodiment of the inventive concepts, and a previous index register PR.

The request generator RG may receive the request size RS and the request count RC from the decoder DC2. For example, the request size RS may include information about the size of a slap to be used. The request count RC may include information about the number of slabs to be used.

The request generator RG may output target rank information TR based on the request size RS and the request count RC. For example, the request generator RG may select a rank in which a slab class to which a slab corresponding to the request size RS belongs is set and may output the target rank information TR indicating the selected rank. The request generator RG may output the target rank information TR as many as a frequency corresponding to a value that the request count RC indicates.

The invalidation check circuit ICC may receive the target rank information TR from the request generator RG. The invalidation check circuit ICC may determine whether information associated with a target rank is stored in the invalidation register IR, based on the invalidation register IR.

The invalidation register IR may store information about an invalidated address IA. For example, the invalidation register IR may store an address of at least one slab previously released, for each rank of the memory system 100.

When the invalidated address IA associated with the target rank is stored in the invalidation register IR, the invalidation check circuit ICC may output the invalidated address IA and the target rank information TR to the address check circuit ACC. The invalidation check circuit ICC may delete the output invalidated address IA from the invalidation register IR. When the invalidated address IA associated with the target rank is not stored in the invalidation register IR, the invalidation check circuit ICC may output the target rank information TR to the address check circuit ACC.

The address check circuit may receive either the target rank information TR and the invalidated address IA or the target rank information TR from the invalidation check circuit ICC. The address check circuit ACC may receive the address table AT from the physical circuit PHY. For example, when the invalidated address IA associated with the target rank is stored in the invalidation register IR, the address check circuit ACC may receive the invalidated address IA and the target rank information TR. When the invalidated address IA associated with the target rank is not stored in the invalidation register IR, the address check circuit ACC may receive the target rank information TR.

When receiving the invalidated address IA and the target rank information TR, the address check circuit ACC may determine whether a slab that the invalidated address IA indicates is a slab in which invalid data is stored or a slab in which valid data is stored, based on the address table AT. When the slab that the invalidated address IA indicates is a slab in which invalid data is stored, the address check circuit ACC may output the invalidated address IA as an allocated address ADDR. When the slab that the invalidated address IA indicates is a slab in which valid data is stored, the address check circuit ACC may ignore the invalidated address IA and may allocate a slab based on the target rank information TR.

When the target rank information TR is received or when the invalidated address IA received together with the target rank information TR is wrong, the address check circuit ACC may refer to the previous index register PR. The previous index register PR may store a previous index PI that indicates an index of a slab just previously allocated in the target rank. The previous index register PR may store the previous index PI for each rank.

When the previous index PI associated with the target rank is stored in the previous index register PR, the address check circuit ACC may search the address table AT based on the previous index PI. For example, the address check circuit ACC may search the address table AT sequentially from the previous index PI and may find a slab storing invalid data.

When the previous index PI associated with the target rank is not stored in the previous index register PR, the address check circuit ACC may search for a slab, which stores invalid data, from a first index of the address table AT.

FIG. 23 is a table illustrating an example of invalidated addresses which the invalidation register IR stores. Referring to FIG. 23, two invalidated addresses may be stored for each rank.

FIG. 24 is a table illustrating an example of previous addresses which the previous index register IR stores. Referring to FIG. 24, a just previously allocated previous index or a previous index may be stored for each rank.

FIG. 25 is a table illustrating an example of the address table AT. According to at least one example embodiment of the inventive concepts, the address table AT corresponding to the first and second ranks RANK1 and RANK2 is illustrated in FIG. 25.

Referring to FIG. 25, one bit may be allocated to each slab of the first slab class SC1 set to the first rank RANK1. When each slab stores valid data, a corresponding bit may be set to "0". When each slab stores invalid data, a corresponding bit may be set to "1".

An address table of each rank may be managed based on an index and a segment. A plurality of segment may correspond to one index. The number of segments may be the same in the first to fourth ranks RANK1 to RANK4. For example, the number of segments may correspond to a sum of input/output lines of memory devices in each rank. That is, segments corresponding to each index may correspond to the size by which the memory controller MC reads data from a selected rank through one read operation, that is, the input/output bandwidth.

For example, slabs of the first rank RANK1 may be managed based on first to sixteenth indexes IDX1 to IDX16 and first to sixteenth segments S1 to S16. Slabs of the second rank RANK2 may be managed based on the first to fourth indexes IDX1 to IDX4 and the first to sixteenth segments S1 to S16.

Because slabs belonging to each rank have the same size, they may occupy the storage space of each rank equally. An address ADDR of each rank may be calculated from a value of an index and a value of a segment of a slab belonging to each rank.

Figure 26:
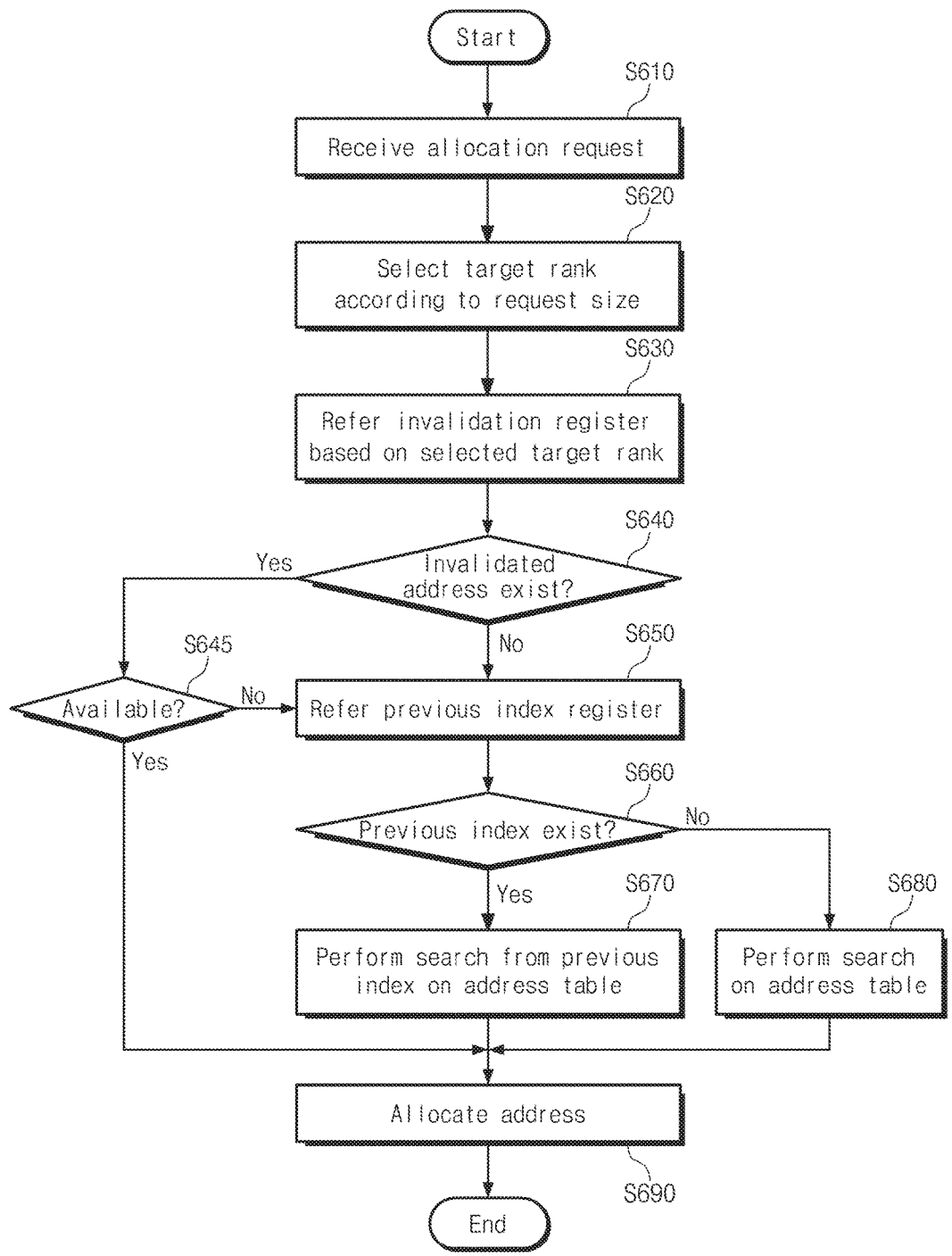
FIG. 26 is a flowchart illustrating a method in which the memory allocator allocates a slab based on an invalidated address, a previous address, and the address table.

FIG. 26 is a flowchart illustrating a method in which the memory allocator MA allocates a slab based on an invalidated address IA, the previous address PI, and the address table AT. Referring to FIGS. 15, 16, 20, and 26, in step S610, the request generator RG may receive the request size RS and the read count RC. For descriptive convenience, it may be assumed that the request count RC is "1".

In step S620, the request generator RG may select a target rank based on the request size RS. The request generator RG, which may be embodied by a circuit or circuitry, may output target rank information TR indicating the selected target rank.

In step S640, the invalidation check circuit ICC may determine whether the invalidated address IA associated with the target rank is stored in the invalidation register IR, based on the invalidation register IR.

If the invalidated address IA is stored in the invalidation register IR, in step S645, whether a slab corresponding to the invalidated address IA is available may be determined. For example, the address check circuit ACC may determine whether a slab corresponding to the invalidated address IA stores valid data, based on the address table AT. If the slab corresponding to the invalidated address IA does not store valid data, it may be determined as being available. Afterwards, when a slab that the invalidated address IA indicates is selected, the process may proceed to step S690. If the slab corresponding to the invalidated address IA stores valid data, it may be determined as being unusable. Afterwards, the process may proceed to step S650.

When the invalidated address IA is not stored or when the invalidated address IA is wrong, the process may proceed to step S650. In step S650, the address check circuit ACC may determine whether the previous index PI exists, based on the previous index register PR. When the previous index PI associated with the target rank is not stored in the previous index register PR, in step S670, the address check circuit ACC may search the address table AT from the previous index PI to find a slab that stores invalid data. The address check circuit ACC may select the found slab. When the previous index PI associated with the target rank is not stored in the previous index register PR, in step S670, the address check circuit ACC may search the address table AT from the previous index PI to find a slab that stores invalid data. The address check circuit ACC may select the found slab.

Afterwards, in step S690, the address check circuit ACC may allocate an address of the selected slab.

As described above, when the invalidated address IA indicating a previously invalidated slab exists, the searching of the address table AT may not be made. Accordingly, a speed in which a slab is selected may be improved.

In addition, when an operation of writing data at each rank starts, as illustrated in FIG. 26, invalid slabs may be focused on indexes of the rear portion of each rank. In this case, a speed in which a slab is selected may be improved by searching the address table AT based on the previous index PI.

Figure 27:
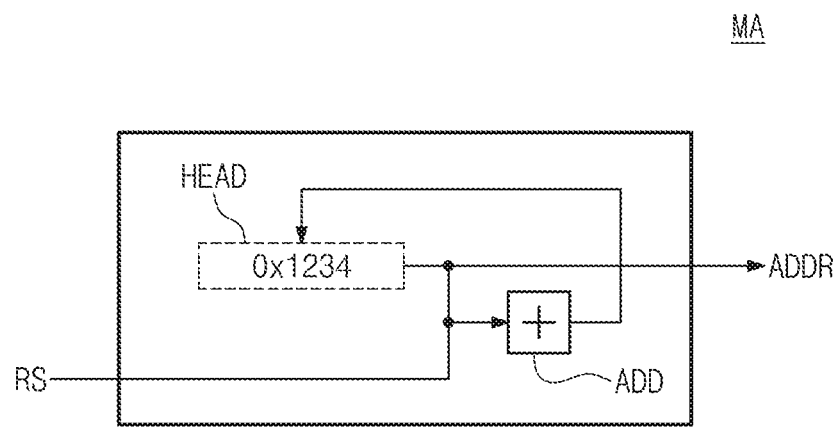
FIG. 27 is a drawing illustrating another example of the memory allocator.

FIG. 27 is a drawing illustrating another example of the memory allocator MA. Because the size of a slab is larger than or equal to a value for storage in allocating a memory in a slab-based manner, an unused fragmentation may be generated. To increase the capacity efficiency of the first memory module SMOD, a memory may be allocated in a log-structured manner. Referring to FIG. 27, the memory allocator MA may manage a head so as to return an allocated address ADDR with respect to a next allocation request, for example, the request size RS. The memory manager MA may return the head based on a memory allocation request and may move a position of the head by the size of a memory requested. According to at least one example embodiment of the inventive concepts, a head of "0x1234" may be returned, and the head may be shifted (e.g., increased) by an adder ADD as many as the request size RS.

Figure 28:
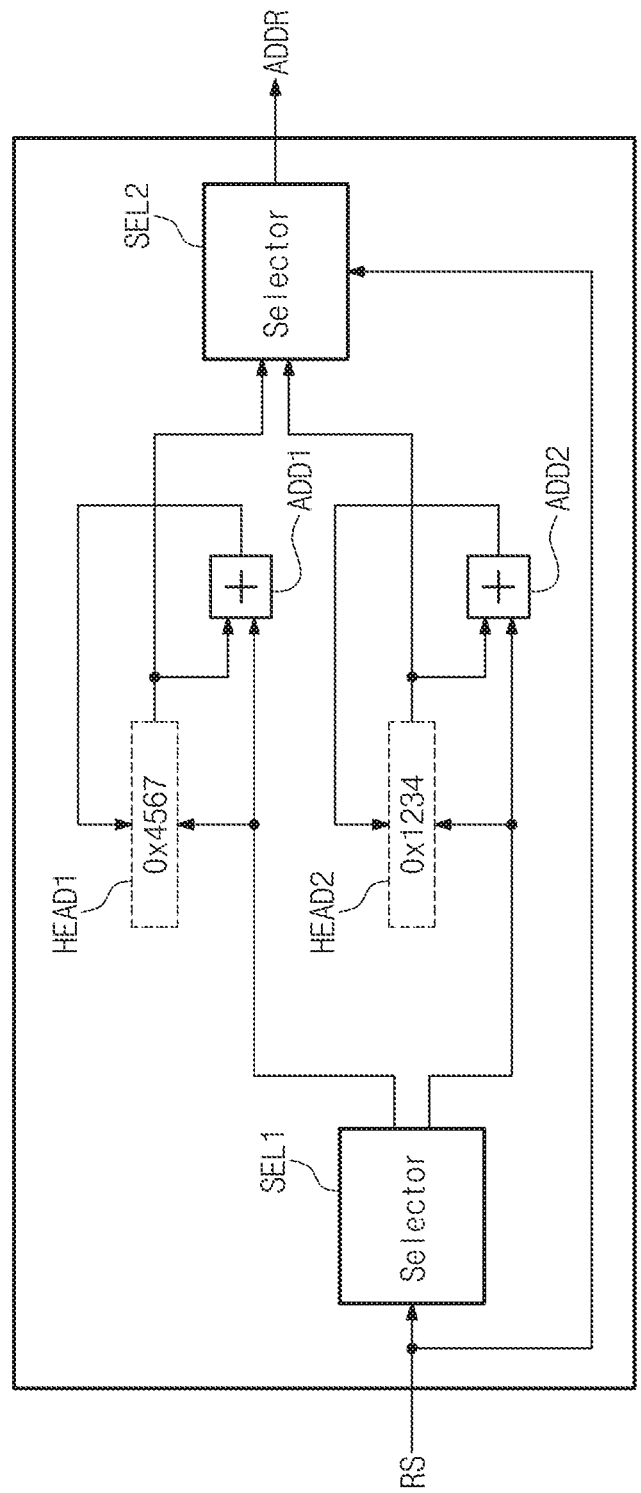
FIG. 28 is a drawing illustrating an example of a multi-head in the memory allocator of a log-structured way.

FIG. 28 is a drawing illustrating an example of a multi-head in the memory allocator MA of a log-structured manner. Referring to FIG. 28, the memory allocator MA may select one of a plurality of heads HEAD1 and HEAD2 based on a memory allocation request, that is, the request size RS. A head may vary according to a kind of memory allocation request, for example, the request size RS, and thus values may be classified and stored to correspond to a property of a memory request. For example, in an object cache, an access pattern may vary according to the size of a value. A value of a relatively small size may have a frequent access pattern, and a value of a relatively large size may have an access pattern of a low frequency. As a plurality of heads HEAD1 and HEAD2 are used, a value may be stored in different second memory modules SMOD or in different memory devices of the second memory module SMOD based on the size of a value. For example, an access frequency of the second memory module SMOD or a memory device in which a value of a relatively large size is stored may be lower than that of the second memory module SMOD or a memory device in which a value of a relatively small size is stored. With the above description, a policy in which the memory system 100 enters a power saving mode may be adjusted according to the size of a value stored in the second memory module SMOD or a memory device.

According to at least one example embodiment of the inventive concepts, a first selector SEL1 may select one of a first head HEAD1 and a second head HEAD2 based on the request size RS. When the first head HEAD1 is selected, the first head HEAD1, for example, "0x4567" may be output to a second selector SEL2. The first head HEAD1 may be shifted (e.g., increased) by a first adder ADD1 as many as the request size RS. When the second head HEAD2 is selected, the second head HEAD2, for example, "0x1234" may be output to a second selector SEL2. The second head HEAD2 may be shifted (e.g., increased) by a second adder ADD2 as many as the request size RS. The second selector SEL2 may select one of the first head HEAD1 and the second head HEAD2 based on the request size RS.

Figure 29:
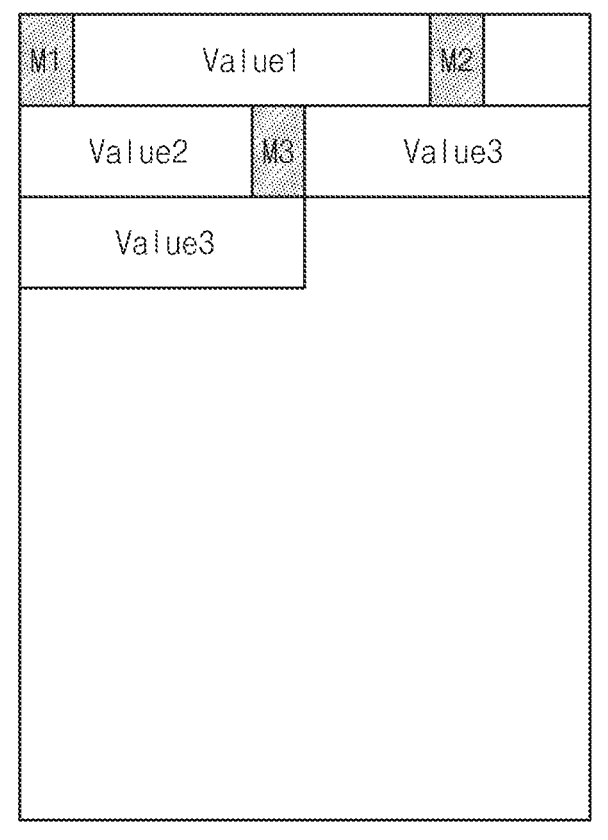

FIG. 29 is a drawing illustrating an example in which a value and metadata associated with the value are stored in a memory when a memory allocator of a log-structured way is used. Referring to FIG. 29, the memory allocator MA may allocate a size, which corresponds to a value of summing a size of a head and a size of metadata, in a storage space of the second memory module SMOD and may adjust a position of the head. The value access circuit VAC (refer to FIG. 27) may store the value together with the metadata.

As is illustrated in FIG. 29, according to at least one example embodiment of the inventive concepts, a first value Value1 and first metadata M2 corresponding to the first value Value1, a second value Value2 and second metadata M2 corresponding to the second value Value2, and a third value Value3 and third metadata corresponding to the third value Value3 are stored. Each metadata may include valid information, information about a value or a size corresponding to a value of summing the value and the metadata, or hash table information.

According to at least one example embodiment of the inventive concepts, when a write operation about a previously stored value is requested, that is, when an update is requested, the value access circuit VAC may update the previously stored value and a validity of metadata associated with the previously stored value together.

According to at least one example embodiment of the inventive concepts, when garbage collection is performed, an area where the garbage collection is to be performed may be scanned. The scanning may include reading metadata and determining the valid of the metadata. When the metadata is valid, a new storage space may be allocated with respect to the valid metadata and a value associated with the valid metadata, and the valid metadata and a value associated with the valid metadata may be copied to the allocated storage space. Metadata of a value stored following the previously scanned value may be scanned based on size information included in the metadata.

Figure 30:
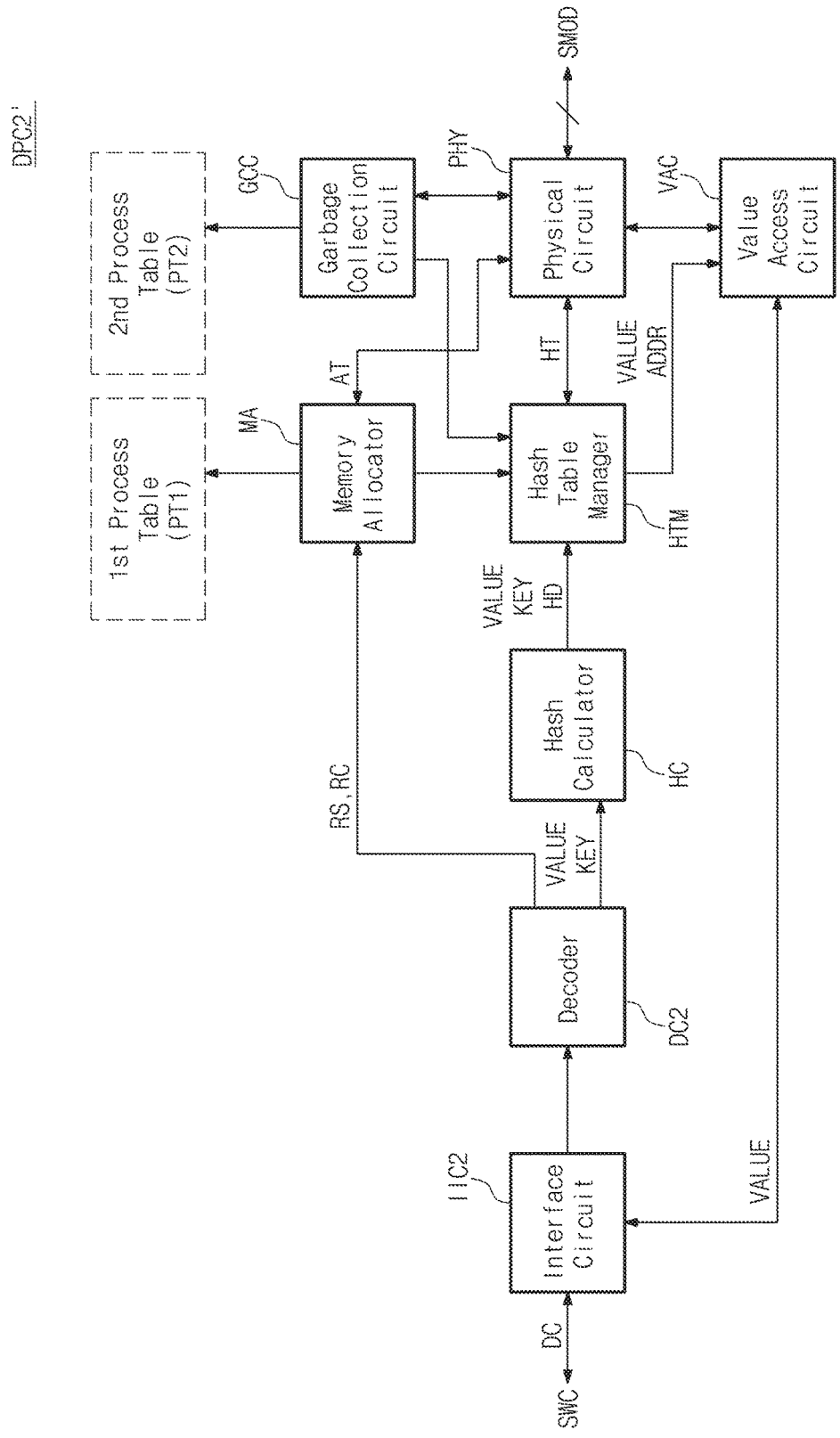
FIG. 30 is a block diagram illustrating an application of the data plane circuit illustrated in FIG. 16.

FIG. 30 is a block diagram illustrating an application of the data plane circuit DPC2 illustrated in FIG. 16. Referring to FIGS. 16 and 30, a data plane circuit DPC2' may include the interface circuit IIC2, the decoder DC2, the hash calculator HC, the memory allocator MA, the hash table manager HTM, the physical circuit PHY, the value access circuit VAC, and a garbage collection circuit GCC. Compared to the data plane circuit DPC2 of FIG. 16, the data plane circuit DPC2' may further include the garbage collection circuit GCC.

The garbage collection circuit GCC may perform garbage collection based on a second process table PT2 stored in the storage circuit SC2. The garbage collection may include an operation of gathering valid slabs that are scattered on the address table AT. For example, the garbage collection circuit GCC may gather valid slabs by copying data of the valid slabs based on the address table AT. The second process table PT2 may include garbage collection policies such as a point in time or a condition where the garbage collection is performed and a method of performing the garbage collection. The second process table PT2 may be controlled and updated by the control plane CP2 of the first memory module MODk and may be updated through the out-of-band interface OOB (an example of which is discussed above with reference to FIG. 8) or the interface circuits IC1 to ICm (examples of which are discussed above with reference to FIG. 2).

When the memory allocator MA of the log-structured way is used, the garbage collection circuit GCC may be configured to scan a memory area in which a value is stored, to copy only valid data to a new area based on the scanning result, and to allow the memory allocator MA to allocate the new area. According to one manner of implementation, when a value is stored in a memory, whether the value is valid and the size of the value may be included in metadata. Upon scanning of the memory area, whether a value is valid may be determined based on metadata of the memory area, and a valid value may be copied to a new area.

Figure 31:
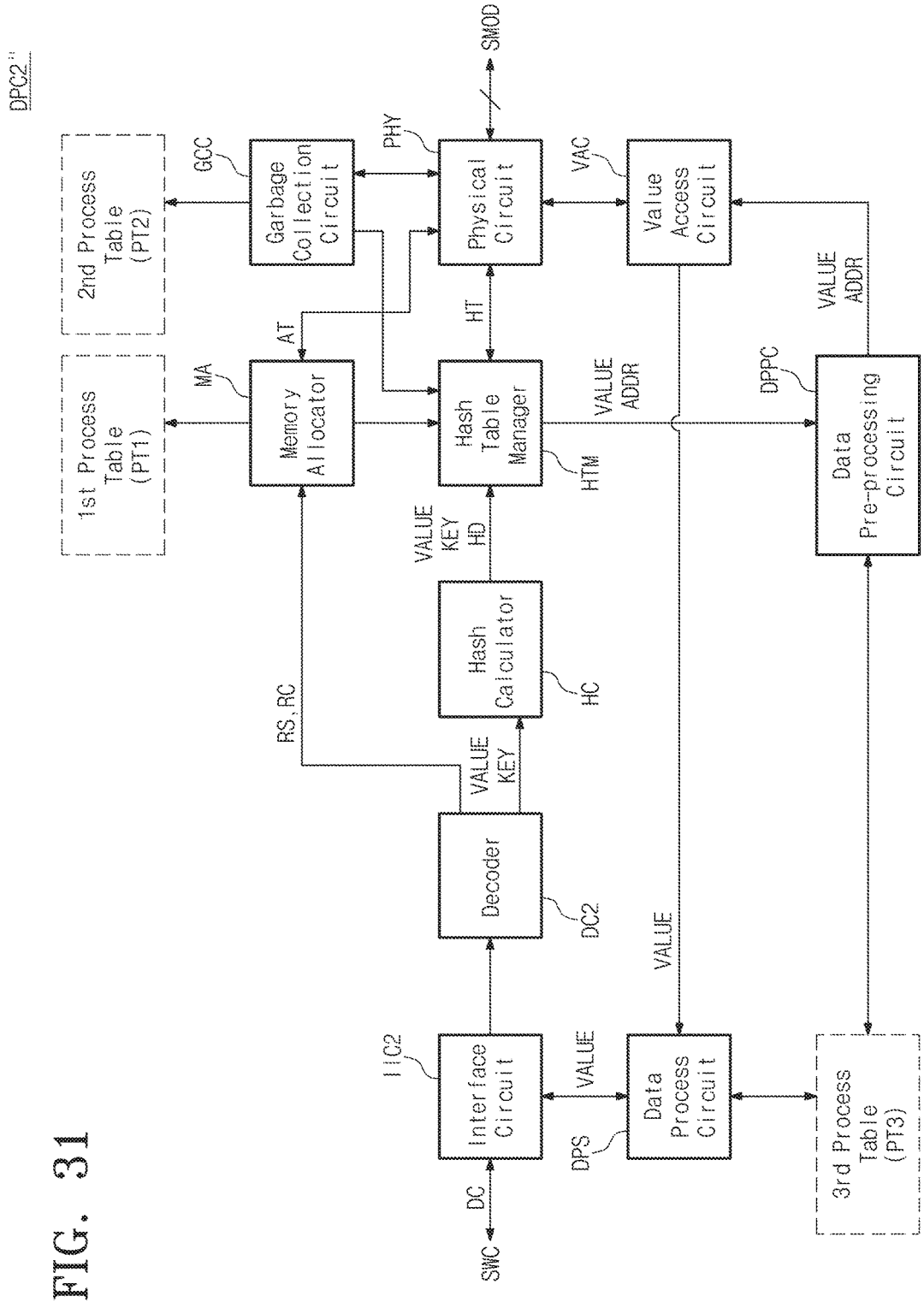
FIG. 31 is a block diagram illustrating an application of the data plane circuit illustrated in FIG. 27.

FIG. 31 is a block diagram illustrating an application of the data plane circuit DPC2' illustrated in FIG. 30. Referring to FIGS. 30 and 31, a data plane circuit DPC2" may include the interface circuit IIC2, the decoder DC2, the hash calculator HC, the memory allocator MA, the hash table manager HTM, the physical circuit PHY, the value access circuit VAC, the garbage collection circuit GCC, a data process circuit DPS, and a data pre-processing circuit DPPC. Compared to the data plane circuit DPC2' of FIG. 30, the data plane circuit DPC2" may further include the data process circuit DPS and the data pre-processing circuit DPPC.

The data pre-processing circuit DPPS may receive a value and an address ADDR from the hash table manager HTM and may perform data pre-processing (e.g., compression, encryption, etc.) with respect to the received value, based on a policy stored in a third process table PT3. The data pre-processing circuit DPPS may output the pre-processed value and the address ADDR to the value access circuit VAC. The data process circuit DPS may perform data processing (e.g., decompression, decryption, etc.) with respect to a value, which is received from the value access circuit VAC, based on the policy stored in the third process table PT3. When the value is image data, the data process circuit DPS may further perform data processing such as downsizing. The data process circuit DPS may send the processed value to the interface circuit IIC2.

Figure 32:
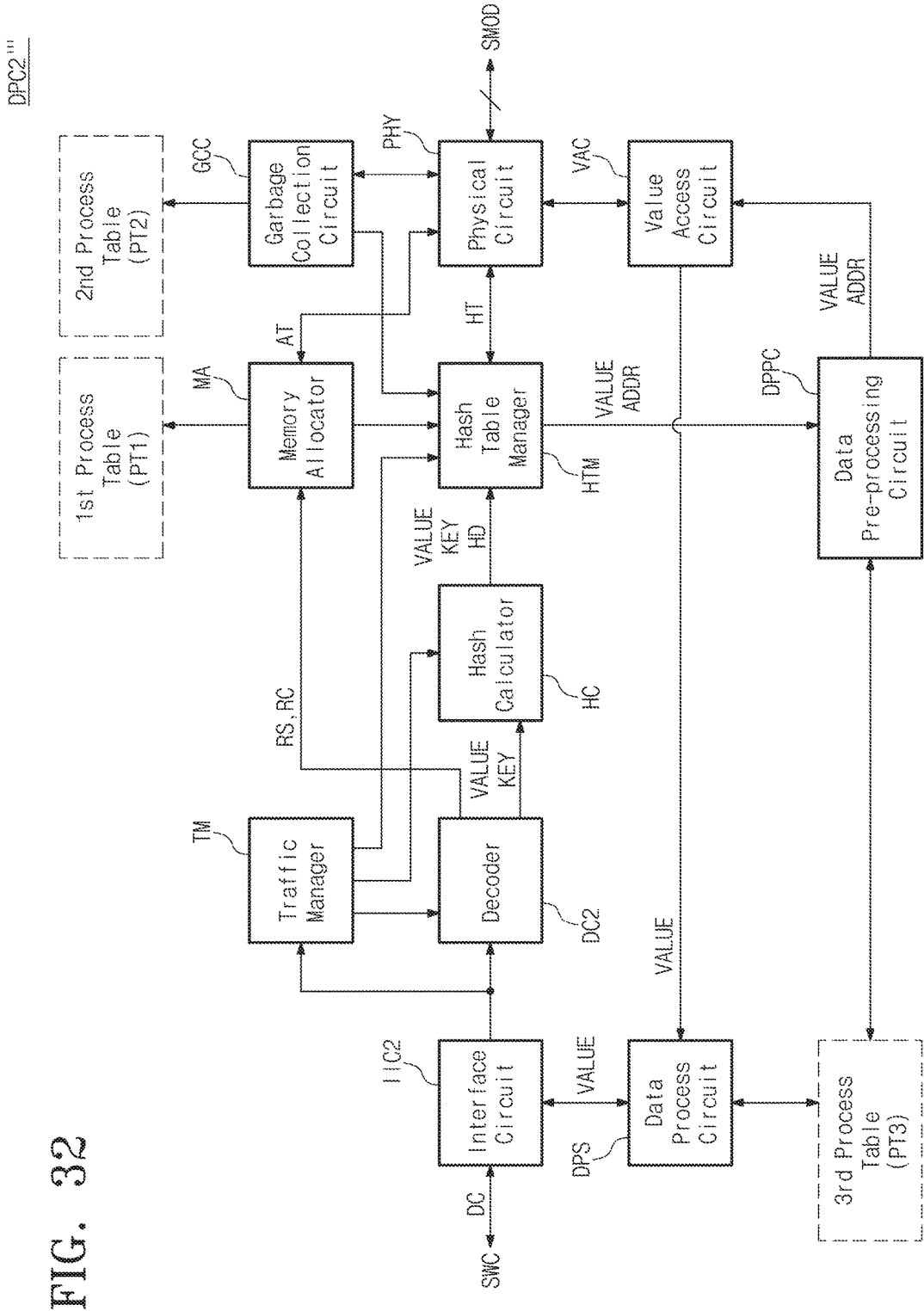
FIG. 32 is a block diagram illustrating an application of the data plane circuit illustrated in FIG. 31.

FIG. 32 is a block diagram illustrating an application of the data plane circuit DPC2" illustrated in FIG. 31. Referring to FIGS. 31 and 32, a data plane circuit DPC2''' may include the interface circuit IIC2, the decoder DC2, the hash calculator HC, the memory allocator MA, the hash table manager HTM, the physical circuit PHY, the value access circuit VAC, the garbage collection circuit GCC, the data process circuit DPS, and a traffic manager TM. Compared to the data plane circuit DPC2" of FIG. 31, the data plane circuit DPC2''' may further include the traffic manager TM. According to at least some example embodiments of the inventive concepts, the traffic manage TM may be embodied by a circuit or circuitry.

According to at least one example embodiment of the inventive concepts, one key-value store based request may be received using two or more data chunks DC. In this case, a first data chunk may include information about the number of data chunks. The traffic manager TM may detect information about the number of data chunks. The traffic manager TM may control the decoder DC2, the hash calculator HC, and the hash table manager HD based on the detected number so as to process two or more data chunks DC with the one key-value store based request.

For example, the decoder DC2 may be controlled by the traffic manager TM and may generate the request size RS and the request count RC based on two or more data chunks DC. The decoder DC2 may be controlled such that a key is detected from two or more data chunks DC once. The hash calculator HC may be controlled such that a hash operation is performed with respect to two or more data chunks once. The hash table manager HTM may be controlled such that the hash table HT is used with respect to two or more data chunks once.

According to at least some example embodiments of the inventive concepts, memory modules, interface circuits, and a data processing path of a switch circuit among the memory modules and the interface circuits may be implemented with hardware. Accordingly, a speed of a server device may be improved.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A server device, comprising:
   a plurality of interface circuits configured to,
      connect with a network, and
      perform format conversion to convert a network packet, from among a plurality of network packets, into a data chunk, the network packets being packets communicated with the network, the data chunk complying with an internal format;
   a plurality of memory modules operating independently of each other; and
   a switch circuit connected between the plurality of interface circuits and the plurality of memory modules, the switch circuit being configured to,
      select at least one memory module from among the plurality of memory modules based on an attribute of the data chunk transmitted from the plurality of interface circuits, and
      send the data chunk to the selected at least one memory module, wherein the selected at least one memory module is configured to,
      perform a hash operation on at least a part of the data chunk to generate hash data from the data chunk, and
      perform a read operation or a write operation associated with the data chunk on a memory area indicated by the hash data.

2. The server device of claim 1 wherein the switch circuit is configured to select two or more memory modules from among the plurality of memory modules when,
   the data chunk includes a key and a value,
   the key of the data chunk includes first information, and
   a command associated with the key and the value is a write command.

3. The server device of claim 2, wherein the switch circuit is configured to select one of the two or more memory modules when,
   the data chunk includes the key,
   the key of the data chunk includes the first information, and
   the command associated with the key is a read command.

4. The server device of claim 1, wherein the switch circuit is configured to reselect another memory module other than a specific memory module when the specific memory module is selected, the specific memory module being a memory module from among the plurality of memory modules, the specific memory module being registered at a switch table.

5. The server device of claim 1, wherein, the switch circuit is configured to select a first memory module from among the plurality of memory modules in response to,
   determining a key included in the data chunk includes first information, and
   determining that a switch table, which stores mapping information mapping data chunk attributes to memory modules, maps the first information to the first memory module.

6. The server device of claim 1, wherein the switch circuit comprises:
   a storage circuit configured to store a switch table that includes a switch policy corresponding to the attribute of the data chunk; and
   a data plane circuit configured to select the at least one memory module, which corresponds to the attribute of the data chunk, based on the switch table stored in the storage circuit.

7. The server device of claim 6, further comprising:
   a control plane circuit configured to process an exception in response to a call from the data plane circuit when the exception occurs at the data plane circuit.

8. The server device of claim 7, wherein the control plane is configured to generate a new policy for the data chunk and incorporate the new policy into the switch policy when the switch policy does not have information for the data chunk.

9. The server device of claim 7, wherein the server device is configured such that a control plane driven by the control plane circuit is updated through at least one of the plurality of interface circuits or an out-of-band (OOB) interface.

10. The server device of claim 6, wherein the server device is configured such that the switch table is updated through at least one of the plurality of interface circuits or an out-of-band (OOB) interface.

11. The server device of claim 6, further comprising:
    a management circuit configured to perform load balancing with respect to the plurality of memory modules by monitoring loads of modules from among the plurality of memory modules and updating the switch table based on a result of the monitoring.

12. The server device of claim 11, wherein the management circuit is configured to forward the data chunk to an external device through the plurality of interface circuits when a load of the server device is greater than or equal to a threshold value.

13. The server device of claim 11, wherein the management circuit is configured to forward the data chunk to an external device through an out-of-band (OOB) interface when a load of the server device is greater than or equal to a threshold value.

14. The server device of claim 1, wherein each interface circuit from among the plurality of interface circuits includes a Transmission Control Protocol/Internet Protocol (TCP/IP) offload circuit configured to extract a payload from a TCP/IP packet among the network packets received from the network.

15. The server device of claim 1 wherein,
    the data chunk includes at least one packet,
    the at least one packet includes a header and a payload, and the switch circuit is configured to select the at least one memory module based on the payload of the at least one packet.

16. The server device of claim 1,
wherein the plurality of memory modules are first memory modules, and each first memory module from among the plurality of memory modules includes,
a plurality of second memory modules, and
a memory controller configured to control the plurality of second memory modules, and
wherein the memory controller includes,
a storage circuit configured to store a first process table that includes a memory allocation policy corresponding to a first attribute of the data chunk, and
a data plane circuit configured to,
allocate a storage space in which the data chunk is to be written, based on the first process table stored in the storage circuit and the first attribute of the data chunk, and
write the data chunk at the allocated storage space.

17. The server device of claim 16, wherein the server device is configured such that the first process table is updated through at least one of the plurality of interface circuits or an out-of-band (OOB) interface.

18. The server device of claim 16 wherein,
the storage circuit is configured to further store a second process table that includes an execution policy of a garbage collection and a third process table that includes a process policy of the data chunk; and
the data plane circuit is configured to,
perform the garbage collection, in which storage spaces where valid data of the plurality of memory modules is stored are gathered, based on the second process table, and
perform at least one of compression, decompression, encryption, decryption, or downsizing of image data based on the third process table.

19. A server device, comprising:
a plurality of interface circuits configured to,
connect with a network, and
detect keys from network packets received from the network;
a plurality of memory modules operating independently of each other; and
a switch circuit connected between the plurality of interface circuits and the plurality of memory modules and configured to,
select at least one memory module from among the plurality of memory modules based on a key transmitted from the plurality of interface circuits, and
send the key to the selected at least one memory module,
the selected at least one memory module being configured to,
perform a hash operation on the key to generate hash data from the key, and
perform a read operation or a write operation associated with the key on a memory area indicated by the hash data.

20. An operating method of a server device comprising a plurality of interface circuits, a switch circuit, and a plurality of first memory modules, each first memory module comprising a memory controller and a plurality of second memory modules corresponding to the memory controller, the method comprising:
receiving, at one of the plurality of interface circuits, a network packet;
converting, at the one of the plurality of interface circuits, the network packet into an internal packet;
extracting, at the switch circuit, an attribute from the internal packet;
selecting, at the switch circuit, at least one first memory module among the plurality of first memory modules based on the attribute;
sending, by the switch circuit, the internal packet to the selected at least one first memory module;
performing, at a memory controller of each of the selected at least one first memory module, a hash operation on at least a part of the internal packet to generate a hash data;
selecting, at the memory controller of the selected at least one first memory module, a second memory module among the plurality of second memory modules corresponding to the memory controller according to the hash data; and
storing, at the selected second memory module, the internal packet.

* * * * *